United States Patent
Saito et al.

(10) Patent No.: US 10,862,618 B2
(45) Date of Patent: *Dec. 8, 2020

(54) USER TERMINAL AND RADIO COMMUNICATION METHOD

(71) Applicant: NTT DOCOMO, INC., Tokyo (JP)

(72) Inventors: Keisuke Saito, Tokyo (JP); Yousuke Sano, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/091,870

(22) PCT Filed: Apr. 6, 2017

(86) PCT No.: PCT/JP2017/014319
§ 371 (c)(1),
(2) Date: Oct. 5, 2018

(87) PCT Pub. No.: WO2017/175819
PCT Pub. Date: Oct. 12, 2017

(65) Prior Publication Data
US 2019/0132079 A1  May 2, 2019

(30) Foreign Application Priority Data
Apr. 8, 2016  (JP) .................................. 2016-078362

(51) Int. Cl.
*H04L 5/00* (2006.01)
*H04W 72/14* (2009.01)
(Continued)

(52) U.S. Cl.
CPC .......... *H04L 1/0018* (2013.01); *H04L 1/0005* (2013.01); *H04L 1/0011* (2013.01);
(Continued)

(58) Field of Classification Search
CPC ......... H04W 74/0833; H04W 72/1284; H04W 24/02; H04L 69/22

See application file for complete search history.

(56) References Cited

U.S. PATENT DOCUMENTS

2010/0195614 A1*  8/2010  Nimbalker ........ H04W 72/1289
                                                    370/330
2013/0329661 A1   12/2013 Chen et al.
(Continued)

OTHER PUBLICATIONS

International Search Report issued in corresponding International Patent Application No. PCT/JP2017/014319, dated Jun. 27, 2017 (2 pages).
(Continued)

*Primary Examiner* — Iqbal Zaidi
(74) *Attorney, Agent, or Firm* — Osha Bergman Watanabe & Burton LLP

(57) ABSTRACT

The present invention is designed to reduce the impact of communication using TTIs with different numbers of symbols (or different numbers of REs) on the throughput of data channels. A transmitting/receiving section that transmits and
(Continued)

receives signals using a plurality of transmission time intervals (TTIs) with different numbers of symbols, and a control section that controls the transmission and receipt of the signals by applying a predetermined transport block size (TBS) in each TTI are provided, where the predetermined TBS in each TTI is controlled according to the number of symbols in each TTI or a target coding rate that is configured in advance.

6 Claims, 21 Drawing Sheets

(51) Int. Cl.
*H04W 72/04* (2009.01)
*H04W 72/12* (2009.01)
*H04L 1/00* (2006.01)
*H04W 28/06* (2009.01)
*H04W 28/18* (2009.01)

(52) U.S. Cl.
CPC .......... *H04L 1/0016* (2013.01); *H04L 5/0044* (2013.01); *H04W 28/06* (2013.01); *H04W 28/18* (2013.01); *H04W 72/14* (2013.01); *H04L 1/0003* (2013.01); *H04L 5/0051* (2013.01); *H04L 5/0057* (2013.01); *H04W 72/042* (2013.01); *H04W 72/1268* (2013.01)

(56) References Cited

U.S. PATENT DOCUMENTS

| | | |
|---|---|---|
| 2015/0200746 A1* | 7/2015 | Pan .................. H04L 1/00 370/329 |
| 2015/0215913 A1* | 7/2015 | Cheng ............... H04L 1/0001 370/330 |
| 2015/0237644 A1 | 8/2015 | Golitschek Edler von Elbwart et al. |

OTHER PUBLICATIONS

Written Opinion issued in corresponding International Patent Application No. PCT/JP2017/014319, dated Jun. 27, 2017 (6 pages).
LG Electronics, "Discussion on PUSCH design with TTIshortening", 3GPP TSG RAN WG1 Meeting #84bis, R1-162509, Busan, Korea, Apr. 11-15, 2016 (10 pages).
ASUSTeK, "Impact on shortened TTIon uplink transmission", 3GPP TSG RAN WG1 Meeting #84bis, R1-163268, Busan Korea, Apr. 11-15, 2016 (2 pages).
3GPP TS 36.300 V8.12.0, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8), Mar. 2010 (149 pages).
Extended European Search Report issued in counterpart European Patent Application No: 17779197.7, dated Oct. 11, 2019 (9 pages).

* cited by examiner

| CQI INDEX | MODULATION | CODE RATE x 1024 | EFFICIENCY |
|---|---|---|---|
| 0 | OUT OF RANGE | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

FIG. 2

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

FIG. 3

| $I_{TBS}$ | $N_{PRB}$ | | | | | | | | | |
|---|---|---|---|---|---|---|---|---|---|---|
| | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | 256 | 552 | 840 | 1128 | 1416 | 1736 | 1992 | 2280 | 2600 | 2856 |
| 15 | 280 | 600 | 904 | 1224 | 1544 | 1800 | 2152 | 2472 | 2728 | 3112 |
| 16 | 328 | 632 | 968 | 1288 | 1608 | 1928 | 2280 | 2600 | 2984 | 3240 |
| 17 | 336 | 696 | 1064 | 1416 | 1800 | 2152 | 2536 | 2856 | 3240 | 3624 |
| 18 | 376 | 776 | 1160 | 1544 | 1992 | 2344 | 2792 | 3112 | 3624 | 4008 |
| 19 | 408 | 840 | 1288 | 1736 | 2152 | 2600 | 2984 | 3496 | 3880 | 4264 |
| 20 | 440 | 904 | 1384 | 1864 | 2344 | 2792 | 3240 | 3752 | 4136 | 4584 |
| 21 | 488 | 1000 | 1480 | 1992 | 2472 | 2984 | 3496 | 4008 | 4584 | 4968 |
| 22 | 520 | 1064 | 1608 | 2152 | 2664 | 3240 | 3752 | 4264 | 4776 | 5352 |
| 23 | 552 | 1128 | 1736 | 2280 | 2856 | 3496 | 4008 | 4584 | 5160 | 5736 |
| 24 | 584 | 1192 | 1800 | 2408 | 2984 | 3624 | 4264 | 4968 | 5544 | 5992 |
| 25 | 616 | 1256 | 1864 | 2536 | 3112 | 3752 | 4392 | 5160 | 5736 | 6200 |
| 26 | 712 | 1480 | 2216 | 2984 | 3752 | 4392 | 5160 | 5992 | 6712 | 7480 |

FIG. 4

| TBS_L1 | TBS_L2 | TBS_L1 | TBS_L2 | TBS_L1 | TBS_L2 | TBS_L1 | TBS_L2 |
|---|---|---|---|---|---|---|---|
| 1544 | 3112 | 3752 | 7480 | 10296 | 20616 | 28336 | 57336 |
| 1608 | 3240 | 3880 | 7736 | 10680 | 21384 | 29296 | 59256 |
| 1672 | 3368 | 4008 | 7992 | 11064 | 22152 | 30576 | 61664 |
| 1736 | 3496 | 4136 | 8248 | 11448 | 22920 | 31704 | 63776 |
| 1800 | 3624 | 4264 | 8504 | 11832 | 23688 | 32856 | 66592 |
| 1864 | 3752 | 4392 | 8760 | 12216 | 24496 | 34008 | 68808 |
| 1928 | 3880 | 4584 | 9144 | 12576 | 25456 | 35160 | 71112 |
| 1992 | 4008 | 4776 | 9528 | 12960 | 25456 | 36696 | 73712 |
| 2024 | 4008 | 4968 | 9912 | 13536 | 27376 | 37888 | 76208 |
| 2088 | 4136 | 5160 | 10296 | 14112 | 28336 | 39232 | 78704 |
| 2152 | 4264 | 5352 | 10680 | 14688 | 29296 | 40576 | 81176 |
| 2216 | 4392 | 5544 | 11064 | 15264 | 30576 | 42368 | 84760 |

FIG. 6

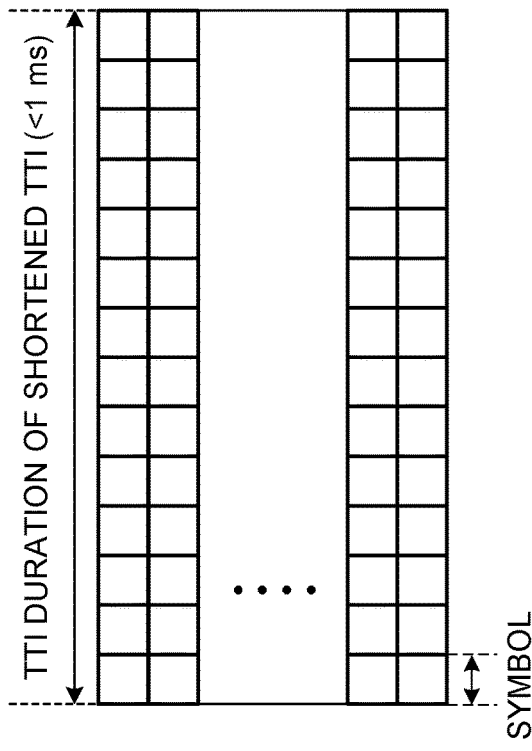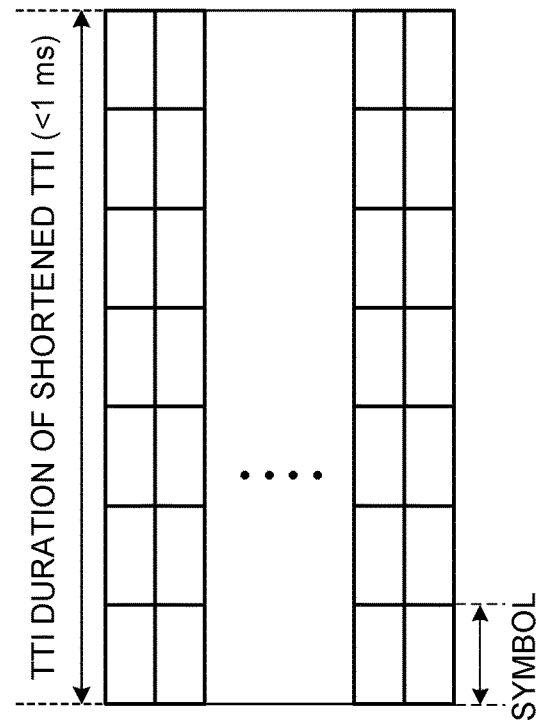
FIG. 8A
FIG. 8B

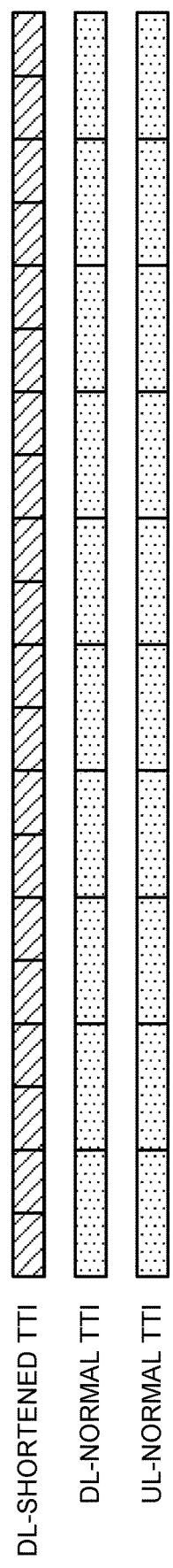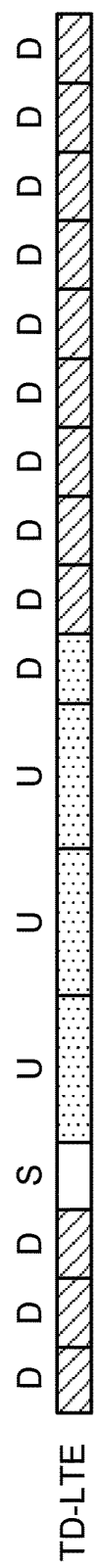
FIG. 9A
FIG. 9B
FIG. 9C

FIG. 12

| $I_{TBS}$ | \multicolumn{10}{c}{$N_{PRB}$} |
| | 1 | 2 | 3 | 4 | 5 | 6 | 7 | 8 | 9 | 10 |
|---|---|---|---|---|---|---|---|---|---|---|
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |

$I_{TBS}$ CORRECTION (5→3)
(TBS: 872→568)

|  | SF#1<br>14 OFDM sym. | SF#2<br>12 OFDM sym. | SF#3<br>8 OFDM sym. |
|---|---|---|---|
| CODING RATE<br>(BEFORE CORRECTION) | R=0.26 | R=0.30 | R=0.45 |
| CODING RATE<br>(AFTER CORRECTION) | R=0.26<br>WITHOUT CORRECTION | R=0.30<br>WITHOUT CORRECTION | R=0.30 |

| $I_{TBS}$ | \multicolumn{10}{c}{$N_{PRB}$} | | | | | | | | | |
|---|---|---|---|---|---|---|---|---|---|---|
| | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |

Arrows: 872 → 776 (SF#2), 776 → 504 (SF#3)

| | SF#1<br>14 OFDM sym. | SF#2<br>12 OFDM sym. | SF#3<br>8 OFDM sym. |
|---|---|---|---|
| CODING RATE (BEFORE CORRECTION) | R=0.26 | R=0.30 | R=0.45 |
| CODING RATE (AFTER CORRECTION) | R=0.26 | R=0.27 | R=0.26 |
| | WITHOUT CORRECTION | (1) CORRECTION OF NUMBER OF SYMBOLS 872×12/14=787.4<br>(2) FILLER BIT CORRECTION (787.4→776) | (1) CORRECTION OF NUMBER OF SYMBOLS 872×8/14=498.3<br>(2) FILLER BIT CORRECTION (498.3→504) |

FIG. 13

| $I_{TBS}$ | $N_{PRB}$ | | | | | | | | | |
|---|---|---|---|---|---|---|---|---|---|---|
| | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |

| SF#1<br>14 OFDM sym. | SF#2<br>12 OFDM sym. | SF#3<br>8 OFDM sym. |
|---|---|---|
| R=0.26 | R=0.30 | R=0.45 |
| R=0.31 | R=0.30 | R=0.30 |
| TBS CORRECTION<br>(872→1032) | WITHOUT<br>CORRECTION | TBS CORRECTION<br>(872→568) |

CODING RATE (BEFORE CORRECTION)

CODING RATE (AFTER CORRECTION)

| CQI index or MCS index | Target Modulation | Target Code rate |
|---|---|---|
| 0 | QPSK | 0.3 |
| 1 | QPSK | 0.5 |
| 2 | QPSK | 0.7 |
| 3 | 16QAM | 0.3 |
| 4 | 16QAM | 0.5 |
| 5 | 16QAM | 0.7 |
| 6 | 64QAM | 0.3 |
| 7 | 64QAM | 0.5 |
| ... | ... | ... |

FIG. 15B

| | | | | | | |
|---|---|---|---|---|---|---|
| 16 | 136 | 376 | 744 | 1608 | 3112 | 6200 |
| 24 | 144 | 408 | 840 | 1800 | 3240 | 6968 |
| 32 | 176 | 440 | 904 | 1992 | 3624 | 7992 |
| 40 | 208 | 488 | 968 | 2152 | 4008 | 9144 |
| 56 | 224 | 520 | 1064 | 2344 | 4264 | 10296 |
| 72 | 256 | 552 | 1160 | 2472 | 4584 | ... |
| 328 | 280 | 584 | 1288 | 2664 | 4968 | ... |
| 104 | 328 | 616 | 1384 | 2856 | 5352 | ... |

USER TERMINAL AND RADIO COMMUNICATION METHOD

TECHNICAL FIELD

The present invention relates to a user terminal and a radio communication method in a next-generation mobile communication system.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). The specifications of LTE-advanced (also referred to as LTE "Rel. 10," "Rel. 11" or "Rel. 12") have been drafted for the purpose of further broadbandization and higher speed beyond LTE (also referred to as "LTE Rel. 8"), and its successor systems (LTE Rel. 13 and later versions) are also under study.

In existing LTE systems (LTE Rel. 12 or earlier versions), adaptive modulation coding (AMC), which adjusts at least one of the modulation scheme and the coding rate adaptively, is used in link adaptation.

In the downlink (DL), at least one of the modulation scheme and the coding rate of a DL data channel (for example, PDSCH: Physical Downlink Shared Channel) is adaptively controlled based on a channel quality indicator (for example, CQI: Channel Quality Indicator) that is fed back from user terminals (for example, UE: User Equipment).

In the uplink (UL), a radio base station (for example, eNB: eNodeB) controls at least one of the modulation scheme and the coding rate of a UL data channel (for example, PUSCH: Physical Uplink Shared Channel) based on received quality (for example, RSRQ: Reference Signal Received Quality).

Also, in existing systems, the transmission time intervals (TTIs) that are applied to DL transmission and UL transmission between radio base stations and user terminals are configured to 1 ms and controlled. A transmission time interval is also referred to as a "communication time interval," and a TTI in LTE systems (Rel. 8 to 12) is also referred to as a "subframe duration."

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall Description; Stage 2"

SUMMARY OF INVENTION

Technical Problem

In existing LTE systems, the transport block size (TBS) to apply to a DL signal and/or a UL signal is uniquely determined depending on the modulation scheme and the number of resource blocks (PRB: Physical Resource Blocks) that are applied to the DL signal and/or the UL signal. Also, the coding rate of a data channel transmitted in a given subframe varies depending on the transport block size that is configured in the subframe and the number of DL and/or UL signals (for example, the number of symbols) allocated in the subframe.

Now, in LTE Rel. 13 and later radio communication systems (for example, 5G), there is a possibility that communication will be carried out in high frequency bands, such as bands of several tens of GHz, or a relatively small amount of data may be communicated as in IoT (Internet of Things), MTC (Machine Type Communication), M2M (Machine To Machine) and so on. Furthermore, the demand for D2D (Device To Device) and V2V (Vehicular To Vehicular) communication, which require low-latency communication, is also increasing.

Reduction of communication delay (latency reduction) is under research in order to provide sufficient communication services in such future radio communication systems. For example, a study is in progress to make the transmission time interval (TTI) that serves as the minimum time unit in scheduling shorter than 1 ms in existing LTE systems (LTE Rel. 8 to 12), and communicate by using these TTIs (which may be referred to as, for example, "shortened TTIs"). In this case, a user terminal might communicate using a plurality of TTIs having different TTI durations.

TTIs with different TTI durations may be formed with different numbers of symbols. In this case, the coding rate of a DL signal and/or a UL signal varies significantly between TTIs with different numbers of symbols, and therefore there is a possibility that the received quality of the DL signal and/or the UL signal becomes excessive or insufficient. As a result, the throughput of data channels may suffer an impact.

The present invention has been made in view of the above, and it is therefore an object of the present invention to provide a user terminal and a radio communication method that can reduce the impact on the throughput of data channels even when communication is performed using TTIs with different numbers of symbols (or different numbers of REs).

Solution to Problem

According to one aspect of the present invention, a user terminal has a transmitting/receiving section that transmits and receives signals using a plurality of transmission time intervals (TTIs) with different numbers of symbols, and a control section that controls the transmission and receipt of the signals by applying a predetermined transport block size (TBS) in each TTI are provided, and, in this user terminal, the predetermined TBS in each TTI is controlled according to the number of symbols in each TTI or a target coding rate that is configured in advance.

Advantageous Effects of Invention

According to the present invention, even when communication is performed using TTIs with different numbers of symbols (or different numbers of REs), the impact on the throughput of data channels can be reduced.

BRIEF DESCRIPTION OF DRAWINGS

FIG. 2 is a diagram to show an example of a CQI table;

FIG. 3 is a diagram to show an example of an MCS table;

FIG. 4 is a diagram to show an example of a TBS table;

FIG. 6 is a diagram to show an example of a conversion table for TBSs in a plurality of layers;

FIGS. 8A and 8B are diagrams to show examples of configurations of shortened TTIs;

FIGS. 9A to 9C are diagrams to show examples of configurations of normal TTIs and shortened TTIs;

FIG. 12 is a diagram to show an example of the method for correcting TBS (first correction method);

FIG. 13 is a diagram to show another example of the method for correcting TBS (second correction method);

FIG. 14 is a diagram to show another example of the method for correcting TBS (third correction method)

FIGS. 15A and 15B are diagrams to show an example of the method for selecting TBS;

DESCRIPTION OF EMBODIMENTS

Figure 1:
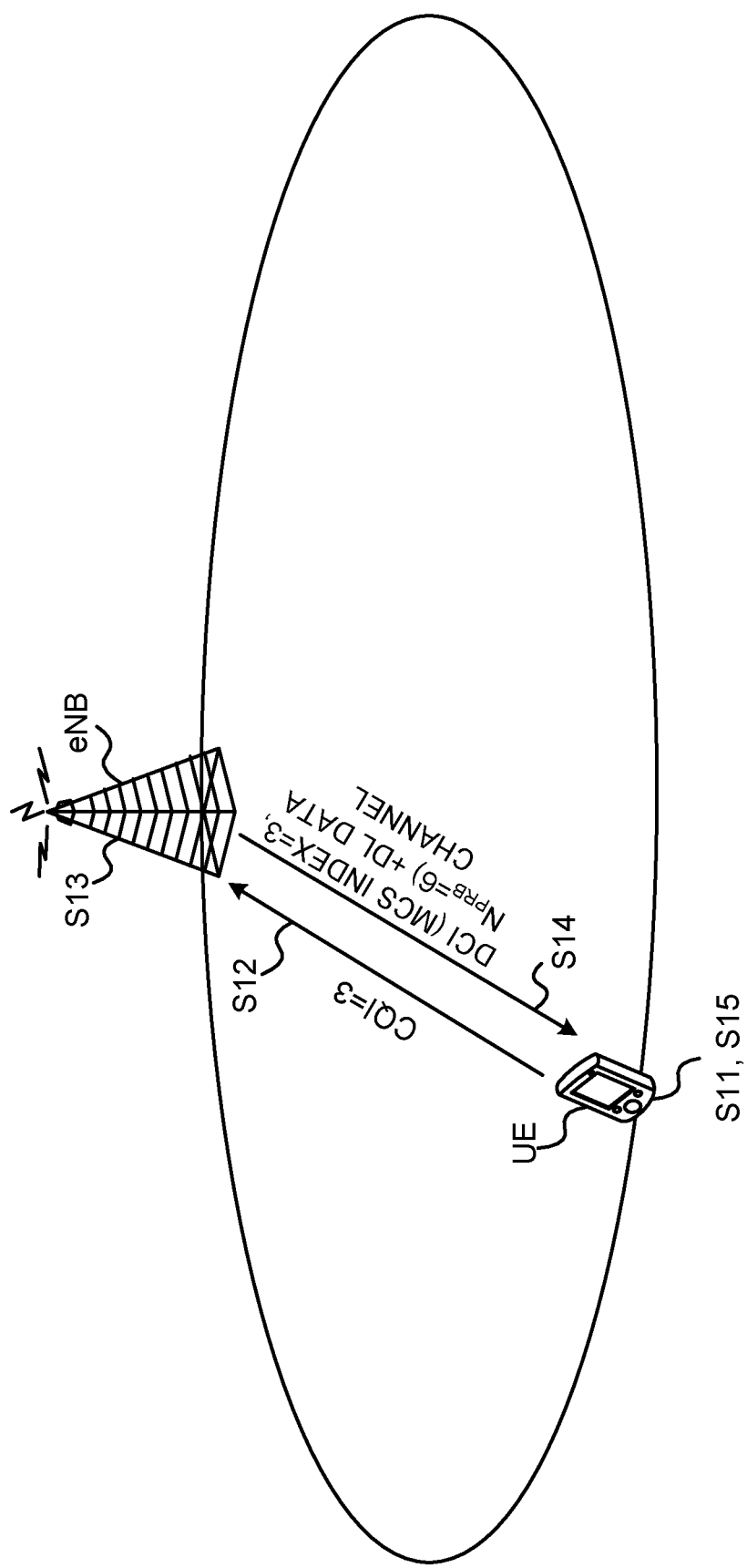
FIG. 1 is a diagram to show an example of determining the TBS for a DL data channel.

Adaptive modulation and coding (AMC) in existing LTE systems will be described with reference to FIG. 1 to FIG. 4. FIG. 1 is a diagram to show an example of determining the TBS for a DL data channel. FIG. 2 is a diagram to show an example of a CQI table. FIG. 3 is a diagram to show an example of an MCS (Modulation and Coding Scheme) table. FIG. 4 is a diagram to show an example of a TBS table.

In the radio communication system shown in FIG. 1, a user terminal (UE) measures the received quality in the DL (for example, RSRP (Reference Signal Received Power)) using reference signals from a radio base station (eNB), and determines the channel quality indicator (CQI) based on this received quality (step S11). To be more specific, the user terminal looks up the CQI table shown in FIG. 2, and selects a CQI that represents a modulation scheme and a coding rate that enable demodulation under the environment of the measured receiving quality.

As shown in FIG. 2, in the CQI table, channel quality indicators (CQIs), modulation schemes, and coding rates are associated. For example, in FIG. 2, sixteen kinds of combinations of modulation schemes and coding rates are defined according to CQIs. Therefore, in FIG. 2, these sixteen kinds of combinations can be identified uniquely by providing four-bit CQIs. Note that, in the CQI table, the value of a CQI may be referred to as a "CQI index."

The user terminal feeds back the CQI, which has been selected with reference to the CQI table shown in FIG. 2, to the radio base station (step S12). For example, in FIG. 1, the CQI "3" is fed back from the user terminal to the radio base station. Note that the CQI is fed back using a UL control channel (for example, PUCCH: Physical Uplink Control Channel) and/or a UL data channel.

The radio base station determines the MCS index and the TBS of the DL data channel based on the CQI fed back from the user terminal (step S13). To be more specific, the radio base station, taking into consideration the quality which the CQI fulfills, the effect of outer loop control and so on, selects an MCS index from the MCS table shown in FIG. 3, and acquires the modulation order and the TBS index that are associated with the MCS index.

Also, looking up the TBS table shown in FIG. 4, the radio base station selects the TBS that is associated with the TBS index acquired from the MCS table and the number of resource blocks (PRBs) allocated to the DL data channel (hereinafter referred to as "the number of allocated PRBs," "$N_{PRB}$," and so on). The radio base station performs the coding process (including rate matching) of the DL data channel based on the acquired TBS.

For example, when the CQI "3" is fed back from the user terminal as shown in FIG. 1, the radio base station selects an arbitrary MCS index (for example, "3") from the MCS table shown in FIG. 3, and acquires the modulation order "2" and the TBS index "3" associated with that MCS index. From the TBS table shown in FIG. 4, the radio base station acquires the TBS "328" that is associated with the TBS index "3" and the number of PRBs allocated to the DL data channel "6." The radio base station performs the signal transmission process such as encoding based on the acquired TBS "328."

The radio base station transmits the downlink control information (DCI) (for example, DL assignment) that includes the determined MCS index and the number of PRBs allocated to the DL data channel, and the DL data channel having been subjected to the coding process as described above, to the user terminal (step S14).

The user terminal acquires the modulation scheme and the TBS for the DL data channel based on the MCS index reported from the radio base station (step S15). To be more specific, the user terminal looks up the MCS table shown in FIG. 3 and acquires the modulation order and the TBS index associated with the MCS index. The user terminal demodulates the DL data channel using the modulation scheme that is associated with the acquired modulation order.

Also, the user terminal looks up the TBS table shown in FIG. 4, and acquires the TBS that is associated with the acquired TBS index and the number of PRBs allocated to the DL data channel. The user terminal performs the decoding process of the DL data channel using the acquired TBS.

Figure 5:
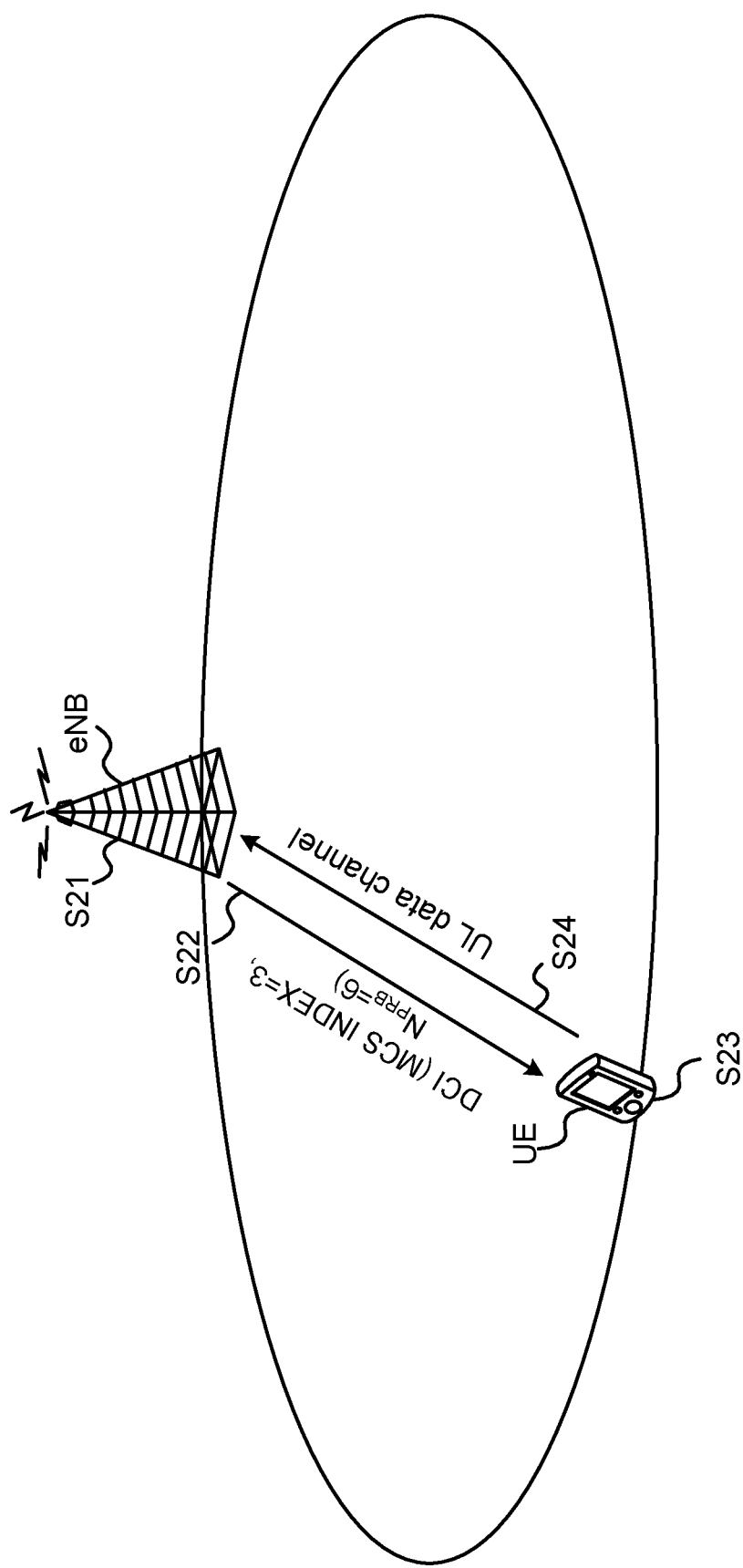
FIG. 5 is a diagram to show an example of determining the TBS for a UL data channel.

FIG. 5 is a diagram to show an example of determining the TBS for a UL data channel. As shown in FIG. 5, the radio base station determines the MCS index to apply to a UL data channel and the number of PRBs to allocate, based on the received quality in the UL, and/or the like (step S21). The radio base station transmits DCI (for example, UL grant), which includes the determined MCS index and the number of PRBs allocate to the UL data channel, to the user terminal (step S22).

The user terminal acquires the modulation scheme and the TBS for the UL data channel based on the MCS index reported from the radio base station (step S23). To be more specific, the user terminal looks up the MCS table shown in FIG. 3, and acquires the modulation order and the TBS index associated with the MCS index. The user terminal modulates the UL data channel using the modulation scheme that is associated with the acquired modulation order.

Also, the user terminal looks up the TBS table shown in FIG. 4, and acquires the TBS that is associated with the acquired TBS index and the number of PRBs to allocate to the UL data channel. The user terminal performs the coding process (for example, rate matching) of the UL data channel using the acquired TBS. The user terminal transmits the UL data channel modulated and encoded as described above, to the radio base station (step S24).

The TBS, determined as described above, is assumed to be transmitted in one layer of a DL data channel and/or a UL data channel (hereinafter referred to as "DL/UL data channel"). When a DL/UL data channel is transmitted in a plurality of layers, the TBS determined as described above is converted according to the number of layers.

FIG. 6 is a diagram to show an example of a TBS conversion table for use in multi-layer transmission. As shown in FIG. 6, the TBS when a DL/UL data channel is transmitted in one layer and the TBS when a DL/UL data channel is transmitted in two layers are associated with each other. For example, if the TBS determined in the above-described fashion is "1928," when the DL/UL data channel is transmitted in two layers, the TBS is converted to "3880."

As described above, the TBS in existing LTE systems is determined uniquely based on an MCS index and the number of PRBs to allocate to a DL/UL data channel, which are selected in a radio base station.

Now, in future radio communication systems such as LTE Rel. 13 and later versions, 5G and/or other systems, there is a demand for a radio interface that is suitable for high frequency bands such as bands of several tens of GHz, a radio interface that minimizes latency, for services like IoT (Internet of Things), MTC (Machine Type Communication), M2M (Machine To Machine), D2D (Device To Device), and V2V (Vehicular To Vehicular).

Figure 7:
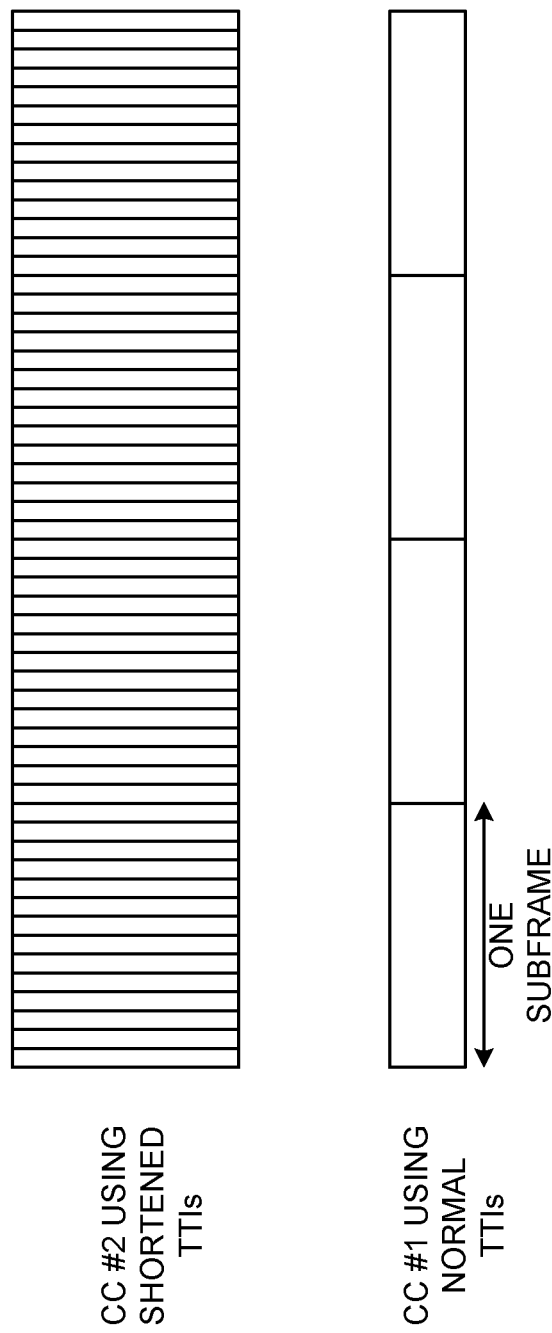
FIG. 7 is a diagram to explain normal TTIs and shortened TTIs.

Therefore, in future communication systems, it may be possible that communication is performed using shortened TTIs, which are TTIs shorter than 1 ms (see FIG. 7). FIG. 7 shows a cell (CC #1) using normal TTIs (1 ms) and a cell (CC #2) using shortened TTIs. Also, when shortened TTIs are used, it may be possible to change the subcarrier spacing (for example, expand the subcarrier spacing) from that of subcarriers with normal TTIs.

When TTIs of a shorter time duration than normal TTIs (hereinafter referred to as "shortened TTIs") are used, the time margin for processing in user terminals and radio base stations (for example, coding, decoding, etc.) increases, so that the processing latency can be reduced. Also, when shortened TTIs are used, it is possible to increase the number of user terminals that can be accommodated per unit time (for example, 1 ms). Below, the configuration of shortened TTIs and so on will be explained.

(Example of Configuration of Shortened TTIs)

Examples of the configuration of shortened TTIs will be described with reference to FIGS. 8. As shown in FIGS. 8A and 8B, shortened TTIs have a time duration (TTI duration) shorter than 1 ms. A shortened TTI may be one TTI duration or multiple TTI durations, whose multiples become 0.5 ms, 0.25 ms, 0.2 ms, 0.1 ms and so on. Alternatively, when normal CPs are used, given that a normal TTI contains fourteen symbols, one TTI duration or multiple TTI durations, whose multiples are integral multiples of 1/14 ms, such as 7/14 ms, 4/14 ms, 3/14 ms, 2/14 ms, and 1/14 ms, may be used. Also, when extended CPs are used, given that a normal TTI contains twelve symbols, one TTI duration or multiple TTI durations, whose multiples are integral multiples of 1/12 ms, such as 6/12 ms, 4/12 ms, 3/12 ms, 2/12 ms and 1/12 ms, may be used.

Also in shortened TTIs, as in conventional LTE, whether to use a normal CP or use an extended CP can be configured by way of higher layer signaling such as broadcast information and RRC signaling. By this means, it is possible to introduce shortened TTIs, while maintaining compatibility (synchronization) with 1-ms normal TTIs.

Note that, although FIGS. 8A and 8B illustrate example cases of using normal CPs, the present invention is not limited to these. Shortened TTIs have only to have a shorter time duration than normal TTIs, and the number of symbols in a shortened TTI, the duration of symbols, the duration of CPs and suchlike configurations are not critical. Also, although examples will be described below in which OFDM symbols are used in the DL and SC-FDMA symbols are used in the UL, the present invention is not limited to these.

FIG. 8A is a diagram to show a first example of the configuration of a shortened TTI. As shown in FIG. 8A, in the first configuration example, a shortened TTI is comprised of fourteen OFDM symbols (or SC-FDMA symbols), which is equal in number to a normal TTI, and each OFDM symbol (each SC-FDMA symbol) has a symbol duration that is shorter than the symbol duration (=66.7 μs) of a normal TTI.

As shown in FIG. 8A, when the symbol duration is shortened while maintaining the number of symbols in a normal TTI, the physical layer signal configuration of the normal TTI (the arrangement of REs, etc.) can be reused. In addition, when maintaining the number of symbols in a normal TTI, it is possible to include, in a shortened TTI, the same amount of information (the same amount of bits) as in the normal TTI. Meanwhile, given that the time duration of symbols in an extended CP is different than symbols in a normal TTI, it is difficult to frequency-multiplex the shortened TTI-signal shown in FIG. 8A with a normal-TTI signal in the same system band (or cell, CC, etc.).

Also, since the symbol duration and the subcarrier spacing are each the reciprocal of the other, as shown in FIG. 8A, when shortening the symbol duration, the subcarrier spacing is wider than the 15-kHz subcarrier spacing of normal TTIs. When the subcarrier spacing becomes wider, it is possible to effectively prevent the inter-channel interference that is caused by the Doppler shift when the user terminal moves, and the deterioration of communication quality due to phase noise in the user terminal's receiver. In particular, in high frequency bands such as bands of several tens of GHz, the deterioration of communication quality can be effectively prevented by expanding the subcarrier spacing.

FIG. 8B is a diagram to show a second example of the configuration of a shortened TTI. As shown in FIG. 8B, according to the second configuration example, a shortened TTI is comprised of a smaller number of OFDM symbols (or SC-FDMA symbols) than a normal TTI, and each OFDM symbol (each SC-FDMA symbol) has the same symbol duration (=66.7 μs) as in a normal TTI. In this case, the shortened TTI can be formed with symbol units of a normal TTI (that is, can be formed with a reduced number of symbols). For example, a shortened TTI can be formed by using part of the fourteen symbols included in one subframe. In FIG. 8B, a shortened TTI is comprised of seven OFDM symbols (SC-FDMA symbols), which is half of a normal TTI.

As shown in FIG. 8B, when maintaining the symbol duration and reducing the number of symbols, the amount of information (the amount of bits) that is included in a shortened TTI can be reduced lower than a normal TTI. Therefore, the user terminal can perform the receiving process (for example, demodulation, decoding, etc.) of the information included in a shortened TTI in a shorter time than a normal TTI, and therefore the processing latency can be shortened. Also, the shortened-TTI signal shown in FIG. 8B and a normal-TTI signal can be frequency-multiplexed in the same system band (or cell, CC, etc.), so that the compatibility with normal TTIs can be maintained.

(Example of Configuration of Shortened TTI)

An example of the configuration of shortened TTIs will be described. When shortened TTIs are used, it is also possible to configure both normal TTIs and shortened TTIs in a user terminal so as to reserve compatibility with existing systems (LTE Rel. 8 to 12). FIGS. 9 show examples of configurations of normal TTIs and shortened TTIs. Note that FIGS. 9 simply show examples, and these are by no means limiting.

FIG. 9A is a diagram to show a first example of the configuration of a shortened TTI. As shown in FIG. 9A, a normal TTI and a shortened TTI may coexist in time in the same component carrier (CC) (frequency domain). To be more specific, a shortened TTI may be configured in a specific subframe (or a specific radio frame) of the same CC. For example, in FIG. 9A, a shortened TTI is configured in five consecutive subframes of the same CC, and normal TTIs are configured in the other subframes. The specific subframes may be, for example, subframes that can be configured as MBSFN subframes, or subframes that include (or do not include) specific signals such as the MIB or synchronization channels. Note that the number and locations of subframes where shortened TTIs are configured are not limited to those shown in FIG. 9A.

FIG. 9B is a diagram to show a second example of the configuration of a shortened TTI. As shown in FIG. 9B, carrier aggregation (CA) or dual connectivity (DC) may be executed by integrating a CC with normal TTIs and a CC with shortened TTIs. To be more specific, shortened TTIs may be configured in specific CCs (to be more specific, in the DL and/or the UL of specific CCs). For example, in FIG. 9B, shortened TTIs are configured in the DL of a specific CC, and normal TTIs are configured in the DL and UL of other CCs. Note that the number and locations of CCs where shortened TTIs are configured are not limited to those shown in FIG. 9B.

Also, in the event of CA, shortened TTIs may also be configured in a specific CC (the primary (P) cell and/or a secondary (S) cell) of the same radio base station. On the other hand, in the event of DC, shortened TTIs may be configured in specific CCs (P cell and/or S cells) in the master cell group (MCG) formed by the first radio base station, or shortened TTIs may be configured in specific CCs (primary secondary (PS) cells and/or S cells) in a secondary cell group (SCG) formed by a second radio base station.

FIG. 9C is a diagram to show an example of a third example of the configuration of a shortened TTI. As shown in FIG. 9C, shortened TTIs may be configured in either the DL or the UL. For example, FIG. 9C shows a case in a TDD system where normal TTIs are configured in the UL, and shortened TTIs are configured in the DL.

Also, specific DL or UL channels or signals may be allocated (configured) in shortened TTIs. Also, a multiple-access scheme that is different from OFDM (or SC-FDMA), which is the multiple-access scheme in LTE Rels. 8 to 12, may be assigned (configured) in shortened TTIs.

As described above, in future radio communication, it is likely that communication will be performed by applying shortened TTIs, which are transmission time intervals reduced to be shorter than normal TTIs, to UL transmission and/or DL transmission. From the perspective of maintaining compatibility with existing LTE systems that use normal TTIs, it is effective to reduce the number of OFDM symbols in a shortened TTI, as shown in FIG. 8B.

Meanwhile, when shortened TTIs are implemented by reducing the number of symbols, the total number of resource elements (REs) in a shortened TTI may decrease. In existing LTE systems, one PRB contains 168 REs (twelve subcarriers×fourteen symbols). It then follows that the total number of REs in a normal TTI (one subframe) is 168×the number of PRBs (twelve subcarriers×fourteen symbols×the number of PRBs). Meanwhile, the total number of REs in a shortened TTI with a reduced number of symbols is less than in a normal TTI. For example, assume the case where a shortened TTI is formed with four symbols. In this case, the total number of REs in the shortened TTI is 48×the number of PRBs (twelve subcarriers×four symbols×the number of PRBs).

In this way, while the number of OFDM symbols in a TTI (subframe) is fourteen in existing LTE systems, in future radio communication systems, it may be possible that subframes (for example shortened TTIs) with varying numbers of symbols in a TTI are introduced. In this case, if the transport block size (TBS) is selected for TTIs with different numbers of symbols in the same way as in existing LTE systems, the coding rate to apply to a signal (for example, a data channel) may vary significantly between TTIs.

Figure 10:
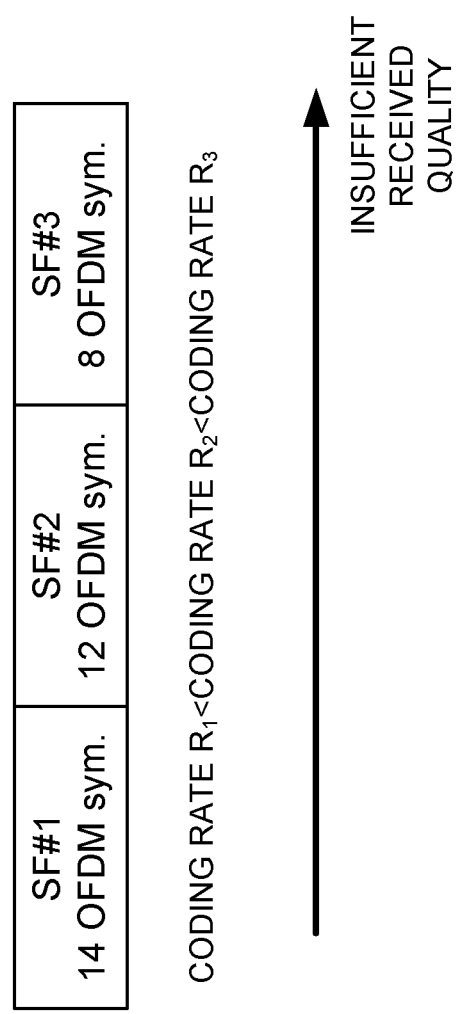
FIG. 10 is a diagram to show the relationships among the number of symbols in a subframe, the coding rate, and received quality.

FIG. 10 is a diagram to show the relationships among the number of symbols in a subframe, the coding rate, and the received quality. FIG. 10 shows the relationships among the number of symbols, the coding rate, and the received quality in the event the TBS is determined using the same method as in existing LTE systems.

For example, as shown in FIG. 10, when the numbers of symbols in subframes (SFs) #1, #2 and #3 are 14, 12 and 8, respectively, the coding rates $R_1$, $R_2$ and $R_3$ of SFs #1, #2 and #3 increase as the number of symbols (the number of REs) decreases. Therefore, even when the TBS, the modulation scheme, and the number of PRBs allocated are the same, the received quality varies depending on the number of symbols (the number of REs) in each SF. By this means, the received quality of data channels becomes excessive or insufficient between SFs with different numbers of symbols, which may affect the throughput of the data channels.

So, the present inventors have noted that the coding rate varies depending on the number of symbols (or the number of REs) that are used for a data channel and the TBS that is selected, and come up with the idea of controlling the TBS taking into account the number of symbols in each TTI. As an aspect of the present embodiment, the present inventors have found out controlling the TBS such that the coding rate does not vary much depending on the number of symbols—in other words, the present inventors have found correcting the TBS such that the coding rate is substantially constant irrespective of the number of symbols (the coding rate varies less between TTIs).

For example, it is possible to correct the TBS depending on the number of symbols using the TBS table in existing LTE systems and/or the table that is newly defined in 5G. For example, it is possible to correct the TBS that is selected in the same procedures as in existing LTE systems, by considering the number of symbols in each TTI. In this way, by controlling the TBS by considering the number of symbols, it is possible to reduce the variation in the coding rate to apply to a signal (for example, a data channel) that is transmitted in different TTIs, and to reduce the decrease of the throughput of the data channel.

Also, to provide another aspect of the present embodiment, the present inventors have come up with the idea of selecting a TBS from a table that lists TBSs so that the coding rate is substantially constant (the coding rate varies less between TTIs) regardless of the number of symbols.

Also, in accordance with one aspect of the present embodiment, when a user terminal corrects a TBS that has been selected based on downlink control information (for example, MCS) transmitted from a radio base station, the radio base station may indicate to the user terminal, via higher layer signaling, whether or not TBS correction applies.

Now, the present embodiment will be described below in detail. Although cases will be described in the following description in which the TBS table for existing LTE systems is used, but this is by no means limiting. It is also possible to use a table that is newly defined in 5G (for example, a TBS table that is defined assuming a certain number of symbols).

Also, although, in the following description, a TTI having a shorter TTI duration than 1 ms will be referred to as a "shortened TTI," this may be also referred to as a "short TTI," a "shortened subframe," or a "short subframe." A 1-ms TTI will be referred to as a "normal TTI," but this may be also referred to as a "long TTI," a "normal subframe," or a "long subframe." Furthermore, the present embodiment can adopt the configurations shown in FIGS. 9. In addition, the present embodiment can also be applied to the case where a subframe with more symbols (a longer TTI duration) than a normal TTI is used.

Also, the present embodiment can also be applied to a user terminal that can communicate using a plurality of TTIs having at least different numbers of symbols (for example, a user terminal that uses a normal TTI and a shortened TTI). Furthermore, although examples based on LTE systems will be illustrated in the following description, the present embodiment is not limited to this, and any system that uses TTIs with varying numbers of symbols is applicable. In addition, a plurality of embodiments described below may be implemented individually or in combination as appropriate.

(Method for Calculating Coding Rate)

According to the present embodiment, the coding rate of a data channel is calculated based on at least one of the TBS of the data channel, the modulation scheme, the number of PRBs allocated, the number of resource elements (REs) per PRB, and the overhead in a subframe.

For example, the coding rate R of a data channel may be calculated based on following equations 1 and 2.

$$R = \frac{TBS}{N_{DCH} \times Q_m} \quad \text{(Equation 1)}$$

$$N_{DCH} = N_{PRB} \times N_{RE} \times (1 - N_{OH}) \quad \text{(Equation 2)}$$

In above equation 1, TBS is the number of information bits that are allocated to a user terminal (a data channel for the user terminal)—that is, a TBS that is determined in the manner that will be described with the first aspect or the second aspect. $Q_m$ is the number of bits per modulated symbol, according to the data channel's modulation scheme. Also, $N_{DCH}$ is the number of REs where the data channel can be mapped in the PRBs ($N_{PRB}$) allocated to the user terminal (a data channel for the user terminal).

Furthermore, in above equation 2, $N_{PRB}$ is the PRBs allocated to the user terminal (the data channel for the user terminal). $N_{RE}$ is the number of resource elements per PRB (for example, the number of symbols per subframe×the number of subcarriers). $N_{OH}$ is the proportion of overhead in the allocated PRBs.

Figure 11:
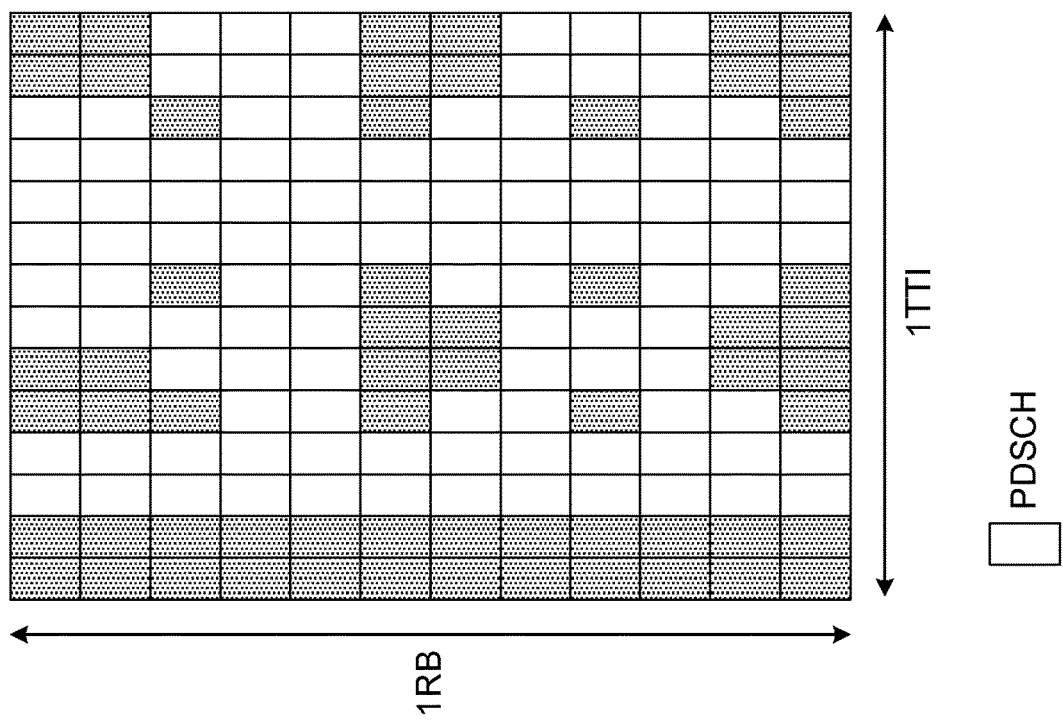
FIG. 11 is a diagram to show examples of resource elements where data channels can be mapped.

FIG. 11 is a diagram to show examples of resource elements where data channels can be mapped (the proportion of overhead). As shown in FIG. 11, a data channel (here, PDSCH) or a signal other than the data channel (for example, a control channel, a reference signal, etc.) is mapped to each RE. The coding rate of the data channel transmitted and/or received in each TTI is determined based on the number of REs in each TTI (subframe) where data channels can be mapped, and the TBS that is selected.

Note that the method of finding the coding rate according to the present embodiment is not limited to above equation 1 and equation 2, and can be found using other equations and/or methods.

(First Aspect)

Now, a case will be described below, in accordance with a first aspect of the present invention, where the TBS is corrected so that the coding rate to apply to a signal (for example, a data channel) that is transmitted and received in each TTI varies less, regardless of the number of symbols in each TTI. In the following description, cases will be shown where the TBS is corrected based on the number of symbols in each TTI, with reference to a TBS table used in existing LTE systems.

In addition, the following correction method can be applied to DL signals (for example, DL data channels) and/or UL signals (for example, UL data channels). For example, a radio base station determines on an MCS index ($I_{MCS}$) based on channel quality information (CQI) that is fed back from a user terminal, selects a TBS index ($I_{TBS}$) from $I_{MCS}$, and selects a TBS that corresponds to $I_{TBS}$ and the number of resource blocks ($N_{PRB}$) allocated to the user terminal, in the TBS table. Then, the radio base station corrects this TBS. Note that the TBS can be determined per codeword (or per sport block).

In addition, the user terminal can correct the TBS selected in the TBS table based on bits that are included in downlink control information and transmitted from the radio base station, and that indicate the MCS index (representing, for example, the modulation and coding scheme and the redundancy version), and the number of PRBs allocated to a data channel. In this case, the radio base station and the user terminal are structured to correct the TBS on a blind basis.

Alternatively, information about the TBS corrected at the radio base station side may be reported to the user terminal. In this case, the user terminal can skip the correction process.

Also, the radio base station may report to the user terminal whether or not TBS correction is applies. For example, a structure may be employed here in which the radio base station reports whether or not the TBS is to be corrected, to the user terminal, by using higher layer signaling and/or downlink control information, and the user terminal, when commanded to correct the TBS, uses the following correction method. By this means, it is possible to flexibly configure whether or not to apply TBS correction, taking into consideration the number of symbols in a TTI used by the user terminal, and/or the like.

(First Correction Method)

According to the first correction method, a threshold for the number of symbols is set, and when a predetermined TTI has a larger number of symbols than this threshold, its TBS is corrected (changed, adjusted, etc.). For example, for this predetermined TTI, at least one of the MCS index ($I_{MCS}$), the TBS index ($I_{TBS}$), and the number of resource blocks ($N_{PRB}$) when the TBS is selected from the TBS table is controlled to be reduced by a predetermined value. In other words, only one of $I_{MCS}$, $I_{TBS}$ and $N_{PRB}$ may be changed, or any two of these values may be changed, or all of the three values may be changed. Note that, although a case to change $I_{TBS}$ will be shown in the following description, this is by no means limiting. Furthermore, when changing a plurality of parameters, $I_{MCS}$, $I_{TBS}$ and $N_{PRB}$ may be lowered by different degrees of subtraction.

FIG. 12 shows an example of the first correction method. Here, for example, the method of correcting the TBS in each TTI (subframe) will be described, assuming a case where the TBS index ($I_{TBS}$) is 5, the number of PRBs ($N_{PRB}$) in a data channel (for example, PDSCH) is ten, the number of REs (assuming there are fourteen symbols) in the PDSCH is 1680 (=120×14), and the modulation scheme is QPSK. Regarding the TTIs, a first TTI (SF #1), in which the number of symbols included is fourteen, a second TTI (SF #2), in which the number of symbols included is twelve, and a third TTI (SF #3), in which the number of symbols included is eight will be assumed. Furthermore, the conditions of correction include that, if the number of symbols is ten or less, at least one of $I_{MCS}$, $I_{TBS}$, and $N_{PRB}$ when the TBS is selected from the TBS table is reduced by a predetermined value (here, $I_{TBS}$ is reduced by a predetermined value of two). Note that the conditions that are applicable to the present embodiment are not limited to this.

When the TBS is selected as in existing LTE systems (before correction), the TBS that is selected from the TBS table based on $I_{TBS}$ (5) and $N_{PRB}$ (10) is 872. In this case, the coding rate (R) of the data channel transmitted in each SF is R=0.26 (SF #1), R=0.30 (SF #2) and R=0.45 (SF #3). Thus, as the number of symbols decreases, the number of REs where data channels can be mapped decreases, so that in a SF with a smaller number of symbols, the coding rate to apply to the data channel is configured higher.

In the event the first correction method is employed, for SF #3 where the number of symbols is not more than a predetermined value (here, ten or less), at least one of $I_{MCS}$, $I_{TBS}$ and $N_{PRB}$ when the TBS is selected from the TBS table is reduced by a predetermined value (here, $I_{TBS}$ is reduced by two). Here, for SF #3, $I_{TBS}$ is subtracted from five to three, and the TBS (568) with $I_{TBS}$ =3 is selected. By this means, the coding rate to apply to the data channel of SF #3 can be adjusted from R=0.45 to 0.30. As a result of this, the differences among the coding rates to apply to the signals transmitted in TTIs with varying numbers of symbols can be reduced (can be made constant, preferably).

Information about the threshold for the number of symbols, which serves as a condition for correction, and/or information about the degree of subtraction to apply to at least one of $I_{MCS}$, $I_{TBS}$ and $N_{PRB}$ when the TBS is selected from the TBS table may be specified in advance in the specification, or may be reported from the radio base station to the user terminal. When reporting the information about the threshold for the number of symbols and/or the information about the degree of subtraction of at least one of $I_{MCS}$, $I_{TBS}$ and $N_{PRB}$ when the TBS is selected from the TBS table, to the user terminal, the radio base station can use higher layer signaling and/or downlink control information.

Regarding the degree of subtraction for at least one of $I_{MCS}$, $I_{TBS}$, and $N_{PRB}$ when the TBS is selected from the TBS table, it is possible to define a plurality of values and report a predetermined value to the user terminal.

For example, the radio base station selects $I_{MCS}$ based on a CQI fed back from the user terminal, selects $I_{TBS}$ from $I_{MCS}$ (here, $I_{TBS}$ =5), and selects (preliminarily determines on) a TBS that corresponds to $I_{TBS}$ and $N_{PRB}$ for the user terminal, in the TBS table. Then, if the number of symbols in a TTI is equal to or less than a predetermined value (here, ten), the TBS is corrected to the TBS where $I_{TBS}$ is a predetermined value (here, two) lower. Note that the radio base station may change $I_{MCS}$ and/or $N_{PRB}$ instead of $I_{TBS}$, or in addition to $I_{TBS}$. In addition, the radio base station reports $I_{MCS}$ and $N_{PRB}$ to the user terminal via downlink control information.

The user terminal selects (preliminarily determines on) a TBS in the TBS table based on $I_{MCS}$ and $N_{PRB}$ transmitted in the downlink control information from the radio base station. Then, when the number of symbols in a TTI is equal to or less than a predetermined value (here, ten), the TBS is corrected to the TBS where $I_{TBS}$ is a predetermined value (here, two) lower. Note that the user terminal may change $I_{MCS}$ and/or $N_{PRB}$ in place of $I_{TBS}$ or in addition to $I_{TBS}$.

In this manner, depending on the number of symbols, at least one of $I_{MCS}$, $I_{TBS}$ and $N_{PRB}$ when the TBS is selected is changed to correct the TBS, so that it is possible to prevent the coding rate to apply to a data channel from varying between TTIs with different numbers of symbols, and to reduce changes in the received quality of the data channel in individual TTIs. By this means, it is possible to reduce the decrease of data channel throughput in each TTI.

Also, by correcting the TBS by changing at least one of $I_{MCS}$, $I_{TBS}$, and $N_{PRB}$ when the TBS is selected from the TBS table based on the number of symbols, it is possible to use values that are defined in the TBS table in advance. By this means, zero filler bits are used, so that filler bit-induced propagation loss can be prevented. In addition, when the radio base station and the user terminal each correct the TBS on a blind basis, there is no need to report the corrected TBS to the user terminal. This can reduce the overhead in the DL.

(Second Correction Method)

In the second correction method, the TBS is corrected per TTI (subframe) based on the number of symbols. For example, when using a subframe, in which the number of symbols is fourteen, and a subframe, in which the number of symbols is eight, the TBSs are corrected so that the TBS (before correction) for the subframe with eight symbols is multiplied by 8/14. Alternatively, it is also possible to configure a reference number of symbols (for example, fourteen) and correct the TBS of each TTI based on its proportion with respect to the reference number of symbols.

FIG. 13 shows an example of the second correction method. Here, as an example, the method of correcting the TBS in each TTI in the event the TBS index ($I_{TBS}$s) is 5, the number of PRBs ($N_{PRB}$) in a data channel is ten, the number of REs in the PDSCH (fourteen symbols) is 1680 (=120×14) and the modulation scheme is QPSK, will be described. As for the TTIs, a first TTI (SF #1) in which the number of symbols included is fourteen, a second TTI (SF #2) in which the number of symbols included is twelve, and a third TTI in which the number of symbols included is eight will be assumed. Furthermore, as for the conditions for correction, a case will be assumed here where correction is applied based on the proportion with respect to the reference number of symbols (here, fourteen). Note that the conditions that can be applied to the present embodiment are not limited to this.

When the TBS is selected (before correction) as in existing LTE systems, the TBS that is selected based on $I_{TBS}$ and $N_{PRB}$ is 872. In this case, the coding rate (R) of the data channel transmitted in each SF is R=0.26 (SF #1), R=0.30 (SF #2) and R=0.45 (SF #3).

In the event the second correction method is used, the TBS is corrected according to the number of symbols in SF #2 and SF #3, which contain different numbers of symbols than the reference number of symbols (here, fourteen). To be more specific, for SF #2 where the number of symbols is twelve, the TBS is corrected (correction of the number of symbols) to 787.4 (=872×12/14).

Furthermore, the value (787.4) that is corrected based on the number of symbols is corrected to the closest value in the TBS table (correction using filler bits). Here, 776, which is closest to 787.4, is selected for the TBS. That is, the value of the corrected TBS is selected from the values in the TBS table.

For SF #3 with eight symbols, the TBS is corrected (correction of the number of symbols) to 498.3 (=872×8/14). Furthermore, the value (498.3) that is corrected based on the number of symbols is corrected to the closest value in the TBS table (correction using filler bits). Here, 504, which is closest to 498.3, is selected for the TBS. That is, the value of the corrected TBS is selected from the values in the TBS table.

For example, the radio base station selects $I_{MCS}$ based on a CQI fed back from the user terminal, selects $I_{TBS}$ from $I_{MCS}$ (here, $I_{TBS}$ =5), and selects (preliminarily determines on) a TBS that corresponds to $I_{TBS}$ and $N_{PRB}$ for the user terminal in the TBS table. Then, when a TTI contains a different number of symbols than the reference number of symbols, the radio base station corrects the TBS based on the reference number of symbols, and selects the TBS that is closest to the corrected TBS, in the TBS table. Also, the radio base station reports $I_{MCS}$ and $N_{PRB}$ to the user terminal via downlink control information.

The user terminal selects (preliminarily determines on) a TBS in the TBS table based on $I_{MCS}$ and $N_{PRB}$ transmitted in the downlink control information from the radio base station. Then, when a TTI contains a different number of symbols than the reference number of symbols, the radio base station corrects the TBS based on the reference number of symbols, and selects the TBS that is closest to the corrected TBS, in the TBS table.

In this manner, by correcting the TBS based on the number of symbols in each TTI, it is possible to associate CQIs and coding rates with each other on a one-by-one basis, regardless of the number of symbols. This makes it possible to prevent the received quality from varying due to the number of symbols (that is, prevent excessive quality or insufficient quality). Also, since the corrected TBS value is selected from the values provided in the TBS table, zero filler bits are used, so that filler bit-induced propagation loss can be prevented. In addition, when the radio base station and the user terminal each correct the TBS on a blind basis, there is no need to report the corrected TBS to the user terminal. This can reduce the overhead in the DL.

Note that the above correction using filler bits may be configured in advance such that, when there are a plurality of TBS values (for example, two kinds) in the TBS table that are closest to the TBS value acquired by way of correction based on the number of symbols, one of these values (for example, the higher value or the low value) is selected for the TBS value. Alternatively, which TBS value (for example, the higher value or the lower value) is to be selected may be reported to the user terminal via signaling (RRC signaling and/or downlink control information).

Note that, although a case has been shown with the above description where the reference number of symbols is configured to a predetermined value, but the reference number of symbols may be changed as appropriate. Also, when TTIs all having varying numbers of symbols along the time direction are used, the number of symbols in a TTI before the TTI where the TBS is determined may be used as the reference number of symbols.

(Third Correction Method)

According to the third method for correction, a predetermined coding rate (target coding rate) is decided in advance, and the TBS to show the closest value to the target coding rate is selected. For example, the target coding rate can be configured per MCS (for example, per MCS index). Furthermore, the target coding rate may be defined in advance in the specification, or may be reported to the user terminal via higher layer signaling and/or downlink control information.

FIG. 14 shows an example of the third correction method. Here, as an example, the method of correcting the TBS in each TTI in the event the TBS index ($I_{TBS}$s) is 5, the number of PRBs ($N_{PRB}$) in a data channel is ten, the number of REs in the PDSCH (fourteen symbols) is 1680 (=120×14) and the modulation scheme is QPSK, will be described. Regarding the TTIs, a first TTI (SF #1), in which the number of symbols included is fourteen, a second TTI (SF #2), in which the number of symbols included is twelve, and a third TTI (SF #3), in which the number of included symbols is eight will be assumed. Furthermore, as for the conditions for correction, a case will be assumed here where the target coding rate ($I_{MCS}$=5) is configured to 0.30. Note that the conditions that can be applied to the present embodiment are not limited to this.

When the TBS is selected (before correction) as in existing LTE systems, the TBS that is selected based on $I_{TBS}$ and $N_{PRB}$ is 872. In this case, the coding rate (R) of the data channel transmitted in each SF is R=0.26 (SF #1), R=0.30 (SF #2) and R=0.45 (SF #3).

In the event the third correction method is used, in SF #1 and SF #3 where the coding rate is different from a predetermined value (here, R=0.3), the TBS is corrected taking the target coding rate into account. To be more specific, for SF #1 (where the number of symbols is fourteen) with a coding rate of 0.26, a TBS value (here, 1032) that makes the coding rate close to 0.30 is selected in the TBS table. The TBS corrected then gives a coding rate of 0.31.

Also, for SF #3 (where the number of symbols is eight) with a coding rate of 0.45, a TBS value (here, 568) that makes the coding rate close to 0.30 is selected in the TBS table. The TBS corrected then gives a coding rate of 0.30.

For example, the radio base station selects $I_{MCS}$ based on a CQI fed back from the user terminal, selects $I_{TBS}$ (here, $I_{TBS}$=5) from $I_{MCS}$, selects (preliminarily determines on) a TBS that corresponds to $I_{TBS}$ and $N_{PRB}$ for the user terminal in the TBS table, and finds the coding rate. Then, if a TTI has a different coding rate than the target coding rate (here, R=0.30), the radio base station selects the TBS that is closest to the target coding rate in the TBS table. In addition, the radio base station reports $I_{MCS}$ and $N_{PRB}$ to the user terminal via downlink control information. The radio base station may exert control so that the coding rate is corrected when it is different from the target coding rate by a predetermined value or more (for example, by 10%).

The user terminal selects (preliminarily determines on) a TBS in the TBS table based on $I_{MCS}$ and $N_{PRB}$ transmitted in the downlink control information from the radio base station. Then, if a TTI has a coding rate that is different from the target coding rate (here, R=0.30), the user terminal selects the TBS that is closest to the target coding rate in the TBS table. The user terminal may exert control so that the coding rate is corrected when it is different from the target coding rate by a predetermined value or more (for example, by 10%).

In this manner, by correcting the TBS based on the target coding rate, it is possible to associate CQIs and coding rates with each other on a one-by-one basis, regardless of the number of symbols. This makes it possible to prevent the received quality from varying due to the number of symbols (that is, prevent excessive quality or insufficient quality). Also, since the corrected TBS value is selected from the values provided in the TBS table, zero filler bits are used, so that filler bit-induced propagation loss can be prevented. In addition, when the radio base station and the user terminal each correct the TBS on a blind basis, there is no need to report the corrected TBS to the user terminal. This can reduce the overhead in the DL.

Note that arrangements may be made in advance so that, when there are a plurality of TBS values (for example, two kinds) in the TBS table that are closest to the target coding rate, one of these values (for example, the higher value or the low value) is selected for the TBS value. Alternatively, which TBS value (for example, the higher value or the lower value) is to be selected may be reported to the user terminal via signaling (RRC signaling and/or downlink control information).

(Second Aspect)

In accordance with a second aspect of the present invention, a case will be described below where the TBS is selected using a table which at least lists TBSs such that the coding rate is substantially constant irrespective of the number of symbols. The TBS selection method which will be described as the second aspect can be applied to DL signals (for example, DL data channels) and/or UL signals (for example, UL data channels). Hereinafter, DL data channels and/or UL data channels will be collectively referred to as "data channels."

According to the second aspect, first, a table in which TBSs are listed (a table to list TBSs that use zero filler bits) is defined in advance. Also, target modulation schemes and/or coding rates that correspond to received quality information such as CQI indices, or MCS indices that are found based on the received quality information, are also provided in advance. As for the table listing TBSs, it is possible to use a TBS table, or to use a table in which TBS values alone are defined.

FIG. 15A shows an example of a table in which target modulation schemes and coding rates are configured in association with CQI indices or MCS indices that are found based on received quality information. FIG. 15B shows an example of a table in which TBSs are listed. The tables of FIGS. 15A and 15B may be defined in advance in the specification, or may be reported from the radio base station to the user terminal via higher layer signaling and/or downlink control information. Alternatively, the radio base station may configure the table of FIG. 15A and/or FIG. 15B in a user terminal that uses the TBS selection based on the target coding rate.

The radio base station and/or the user terminal derive a pre-configured target modulation scheme and target coding rate from, for example, received quality information, an MCS index that is found based on the received quality information, and so on. Then, the radio base station and/or the user terminal select the TBS to show the closest value to the target coding rate in the TBS-listing table.

Here, an example of the method for selecting a TBS will be described below, assuming a TTI, (subframe) in which the number of REs where data channels can be mapped is 1000, and in which the applicable CQI index or MCS index is 3.

First, the radio base station selects the target modulation scheme (here, 16QAM) and the target coding rate (0.3 here) when the CQI index or the MCS index is 3 in the table shown in FIG. 15A. Next, the radio base station selects a TBS with a coding rate of 0.3. For example, the radio base station finds a TBS (here, TBS=1200) having a coding rate of 0.3 using equation 1 and so on, and then selects the TBS that is closest to the calculated TBS, in the TBS-listing table.

When using the table of FIG. 15B, the radio base station selects 1160 as the TBS that is closest to 1200. Note that the coding rate when the TBS is 1160 is 0.29, and can be configured approximately equal to the target coding rate 0.3. Also, the radio base station reports at least the MCS index to the user terminal. The radio base station may also report information related to the target modulation scheme and/or the target coding rate to the user terminal.

The user terminal selects the target modulation scheme (here, 16QAM) and the target coding rate (0.3 in this case) associated with the MCS index reported from the radio base station, and selects a TBS with a coding rate of 0.3. For example, the user terminal finds a TBS (here, TBS=1200) having a coding rate of 0.3 using equation 1 and so on, and then selects the TBS that is closest to the TBS that is found, in the TBS-listing table.

Note that the radio base station and/or the user terminal may directly select the TBS that is closest to the target coding rate in the TBS table.

In this way, by selecting a TBS in a TBS table considering the target coding rate that is configured in advance, it is possible to configure the coding rate substantially constant irrespective of the number of symbols in each TTI. Also, by selecting a TBS value from the values provided in a TBS table, zero filler bits are used, so that filler bit-induced propagation loss can be prevented. In addition, when the radio base station and the user terminal each select the TBS on a blind basis, there is no need to report the selected TBS to the user terminal. This can reduce the overhead in the DL.

Note that arrangements may be made in advance so that, when there are a plurality of TBS values (for example, two kinds) in the TBS table that are closest to the target coding rate, one of these values (for example, the higher value or the low value) is selected for the TBS value. Alternatively, which TBS value (for example, the higher value or the lower value) is to be selected may be reported to the user terminal via signaling (RRC signaling and/or downlink control information).

Also, the radio base station may report to the user terminal whether or not to apply the TBS selection based on the target coding rate. For example, arrangements may be made so that the radio base station reports to the user terminal, using higher layer signaling and/or downlink control information, whether or not the TBS selection based on the target coding rate is to be used, and the user terminal, where TBS selection is commanded, performs the following selection method. By this means, it is possible to flexibly configure whether or not to perform TBS selection based on the target coding rate, taking into consideration the number of symbols in TTIs used by the user terminal and so on.

(Radio Communication System)

Now, the structure of a radio communication system according to an embodiment of the present invention will be described below. In this radio communication system, the radio communication method according to each above-described embodiment is employed. Note that the radio communication method according to each embodiment may be used alone or may be used in combination.

Figure 16:
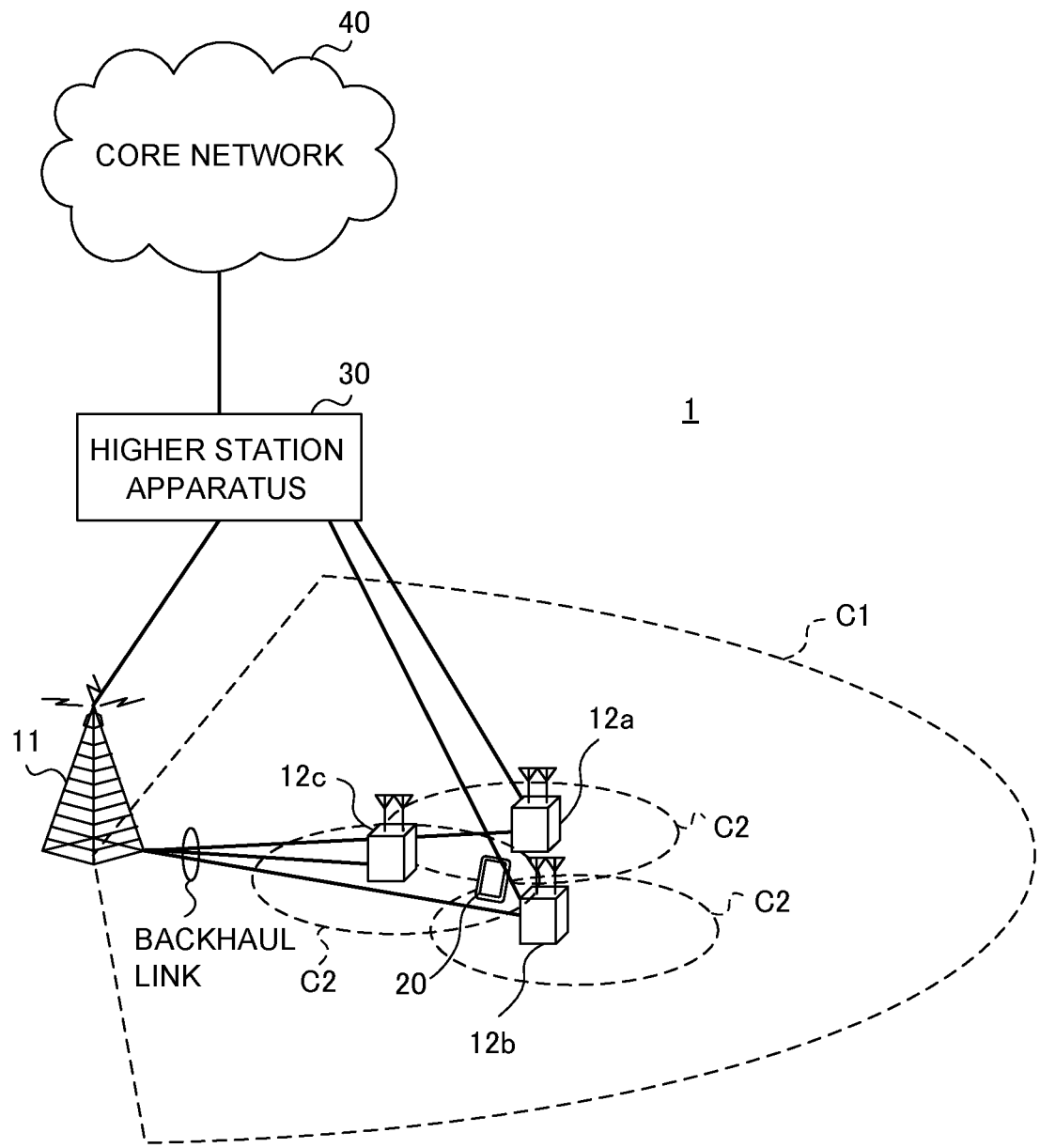
FIG. 16 is a diagram to show an example of a schematic structure of a radio communication system according to the present embodiment.

FIG. 16 is a diagram to show an example of a schematic structure of a radio communication system according to the present embodiment. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit. Also, the radio communication system 1 has a radio base station (for example, an LTE-U base station) that is capable of using unlicensed bands.

Note that the radio communication system 1 may be referred to as "SUPER 3G," "LTE-A (LTE-Advanced)," "IMT-Advanced," "4G" (4th generation mobile communication system), "5G (5th generation mobile communication system)," "FRA" (Future Radio Access) and so on.

The radio communication system 1 shown in FIG. 16 includes a radio base station 11 that forms a macro cell C1, and radio base stations 12 (12a to 12c) that form small cells C2, which are placed within the macro cell C1 and which are narrower than the macro cell C1. Also, user terminals 20 are placed in the macro cell C1 and in each small cell C2. For example, a mode may be possible in which the macro cell C1 is used in a licensed band and the small cells C2 are used in unlicensed bands (LTE-U). Also, a mode may be also possible in which part of the small cells is used in a licensed band and the rest of the small cells are used in unlicensed bands.

The user terminals 20 can connect with both the radio base station 11 and the radio base stations 12. The user terminals 20 may use the macro cell C1 and the small cells C2 at the same time by means of CA or DC.

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these. Furthermore, the user terminals 20 can communicate with the radio base station 11 and/or the radio base stations 12 using a plurality of TTIs with different numbers of symbols.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise. Also, it is preferable if radio base stations 10 that use the same unlicensed band on a shared basis are configured to be synchronized with each other in time.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) is applied to the uplink. OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are by no means limited to the combination of these.

In the radio communication system 1, a downlink shared channel (PDSCH: Physical Downlink Shared CHannel), which is used by each user terminal 20 on a shared basis, a broadcast channel (PBCH: Physical Broadcast CHannel), downlink L1/L2 control channels and so on are used as downlink channels. The PDSCH may be referred to as a "downlink data channel." User data, higher layer control information and SIBs (System Information Blocks) are communicated in the PDSCH. Also, the MIB (Master Information Block) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH. A CFI (Control Format Indicator), which indicates the number of OFDM symbols to use for the PDCCH, is communicated by the PCFICH. HARQ delivery acknowledgement information (ACK/NACK) in response to the PUSCH is communicated by the PHICH. The EPDCCH is frequency-division-multiplexed with the PDSCH, and used to communicate DCI and so on, like the PDCCH.

In the radio communication system 1, an uplink shared channel (PUSCH: Physical Uplink Shared CHannel), which is used by each user terminal 20 on a shared basis, an uplink control channel (PUCCH: Physical Uplink Control CHannel), a random access channel (PRACH: Physical Random Access CHannel) and so on are used as uplink channels. The PUSCH may be referred to as an "uplink data channel." User data and higher layer control information are communicated by the PUSCH. Also, downlink radio quality information (CQI: Channel Quality Indicator), delivery acknowledgement information (ACK/NACK) and so on are communicated by the PUCCH. By means of the PRACH, random access preambles for establishing connections with cells are communicated.

In the radio communication system 1, the cell-specific reference signal (CRS: Cell-specific Reference Signal), the channel state information reference signal (CSI-RS: Channel State Information-Reference Signal), the demodulation reference signal (DMRS: DeModulation Reference Signal), the discovery and/or measurement reference signal (DRS: Discovery Reference Signal) and so on are communicated as downlink reference signals. Also, in the radio communication system 1, the measurement reference signal (SRS: Sounding Reference Signal), the demodulation reference signal (DMRS) and so on are communicated as uplink reference signals. Note that the DMRS may be referred to as a "user terminal-specific reference signal (UE-specific Reference Signal)." Also, the reference signals to be communicated are by no means limited to these.

<Radio Base Station>

Figure 17:
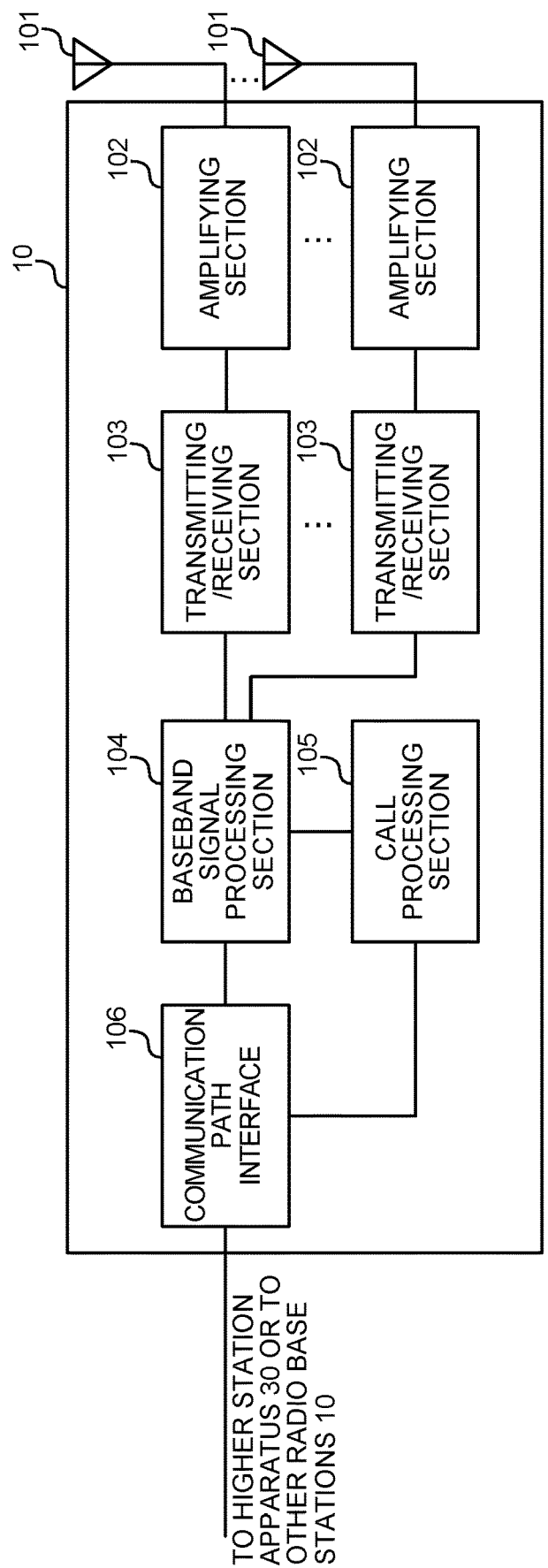
FIG. 17 is a diagram to show an example of an overall structure of a radio base station according to the present embodiment.

FIG. 17 is a diagram to show an example of an overall structure of a radio base station according to the present embodiment. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 through the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101.

The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

Note that the transmitting/receiving sections 103 transmit DL signals and/or UL signals using a plurality of transmission time intervals (TTI) with varying numbers of symbols. For example, the transmitting/receiving sections 103 transmit an MCS index ($I_{MCS}$) and the number of PRBs to allocate to a data channel (for example, a UL data channel and/or a DL data channel) to a user terminal 20, in the downlink control information. To be more specific, the transmitting/receiving sections 103 transmit the number of PRBs to allocate to a UL data channel and the MCS index to apply to the UL data channel using a UL grant, and transmit the number of PRBs to allocate to a DL data channel and the MCS index to apply to the DL data channel using a DL assignment.

Figure 18:
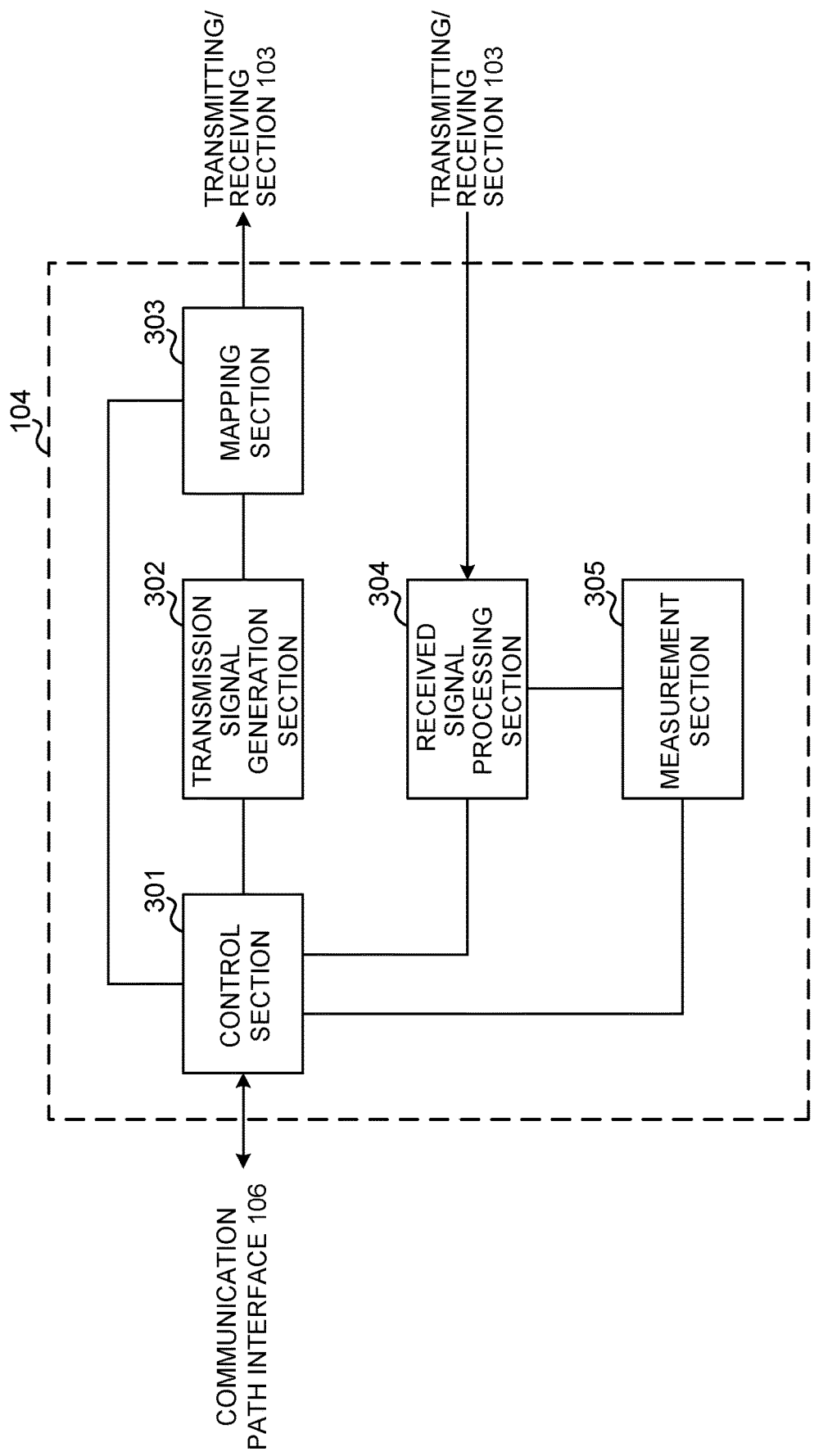
FIG. 18 is a diagram to show an example of a functional structure of a radio base station according to the present embodiment.

FIG. 18 is a diagram to show an example of a functional structure of a radio base station according to the present embodiment. Note that, although FIG. 18 primarily shows functional blocks that pertain to characteristic parts of present embodiment, the radio base station 10 has other functional blocks that are necessary for radio communication as well. As shown in FIG. 18, the baseband signal processing section 104 at least has a control section (scheduler) 301, a transmission signal generation section 302, a mapping section 303, a received signal processing section 304 and a measurement section 305.

The control section (scheduler) 301 controls the whole of the radio base station 10. For example, the control section 301 controls communication using a plurality of TTIs with different numbers of symbols (TTI durations). The control section 301 can be constituted by a controller, a control circuit or control apparatus that can be described based on general understanding of the technical field to which the present invention pertains.

The control section 301, for example, controls the generation of downlink signals in the transmission signal generation section 302, the allocation of downlink signals by the mapping section 303, and so on. Furthermore, the control section 301 controls the signal receiving processes in the received signal processing section 304, the measurements of signals in the measurement section 305, and so on. The control section 301 controls the scheduling, generation, mapping, transmission and so on of downlink signals (system information, DCI-transmitting PDCCH/EPDCCH, PDSCH, downlink reference signals, synchronization signals, etc.). Furthermore, the control section 301 controls the scheduling, receipt and so on of uplink signals (PUSCH, PUCCH, PRACH, uplink reference signals, etc.).

In addition, the control section 301 controls the receipt of UL signals and/or the transmission of DL signals using a predetermined TBS for each TTI. For example, to ensure that the coding rate of a signal varies less when the signal is transmitted and/or received in TTIs with different numbers of symbols, the control section 301 controls the correction of each TTI's TBS that is selected in a TBS table, or controls the selection of TBSs based on target coding rates.

For example, if there is a signal in a TTI where the number of symbols is equal to or less than a predetermined value, the control section 301 corrects the TBS (the first correction method described above). To be more specific, if there is a TTI where the number of symbols is equal to or less than a predetermined value, the control section 301 reduces at least one of $I_{MCS}$, $I_{TBS}$ and $N_{PRB}$ when the TBS is selected from a TBS table, by a predetermined value, and selects a TBS that corresponds to the reduced value (see FIG. 12).

Alternatively, the control section 301 corrects the TBS of each TTI, which is selected individually from a TBS table, based on the reference number of symbols, and then selects the TBS that is closest to the corrected TBS in the TBS table (see the above-described second correction method and FIG. 13).

Alternatively, the control section 301 selects a predetermined coding rate (target coding rate), and, if there is a TTI where the coding rate is different from the target coding rate, corrects the TBS (make selections from the TBS table) to be closer to the target coding rate (see the third correction method described above, and FIG. 14).

Alternatively, based on a table which at least lists TBSs, and based on a target modulation scheme and a target coding rate that are configured in association with a CQI index and/or an MCS index, the control section 301 selects the TBS that is closest to the target coding rate in the table (see the above-described second aspect and FIG. 15).

The transmission signal generation section 302 generates downlink signals based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments for reporting information about downlink resource allocation and UL grants for reporting information about uplink resource allocation, based on commands from the control section 301. Also, downlink data signals are subjected to a coding process and a modulation process by using coding rates, modulation schemes and so on, which are determined based on the results of CSI measurements in each user terminal 20 and so on. Also, the transmission signal generation section 302 generates a DRS that includes a PSS, an SSS, a CRS, a CSI-RS and so on.

The mapping section 303 maps the downlink signals generated in the transmission signal generation section 302 to predetermined radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals are, for example, uplink signals transmitted from the user terminals 20. For the received signal processing section 304, a signal processor, a signal processing circuit or signal processing apparatus that can be described based on general understanding of the technical field to which the present invention pertains can be used.

The received signal processing section 304 outputs the decoded information acquired through the receiving processes to the control section 301. For example, when a PUCCH to contain an HARQ-ACK is received, the received signal processing section 304 outputs this HARQ-ACK to the control section 301. Also, the received signal processing section 304 outputs the received signals, the signals after the receiving processes and so on, to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

The measurement section 305 may measure the received power (for example, the RSRP (Reference Signal Received Power)), the received quality (for example, RSRQ (Reference Signal Received Quality)), channel states and so on of the received signals. The measurement results may be output to the control section 301.

<User Terminal>

Figure 19:
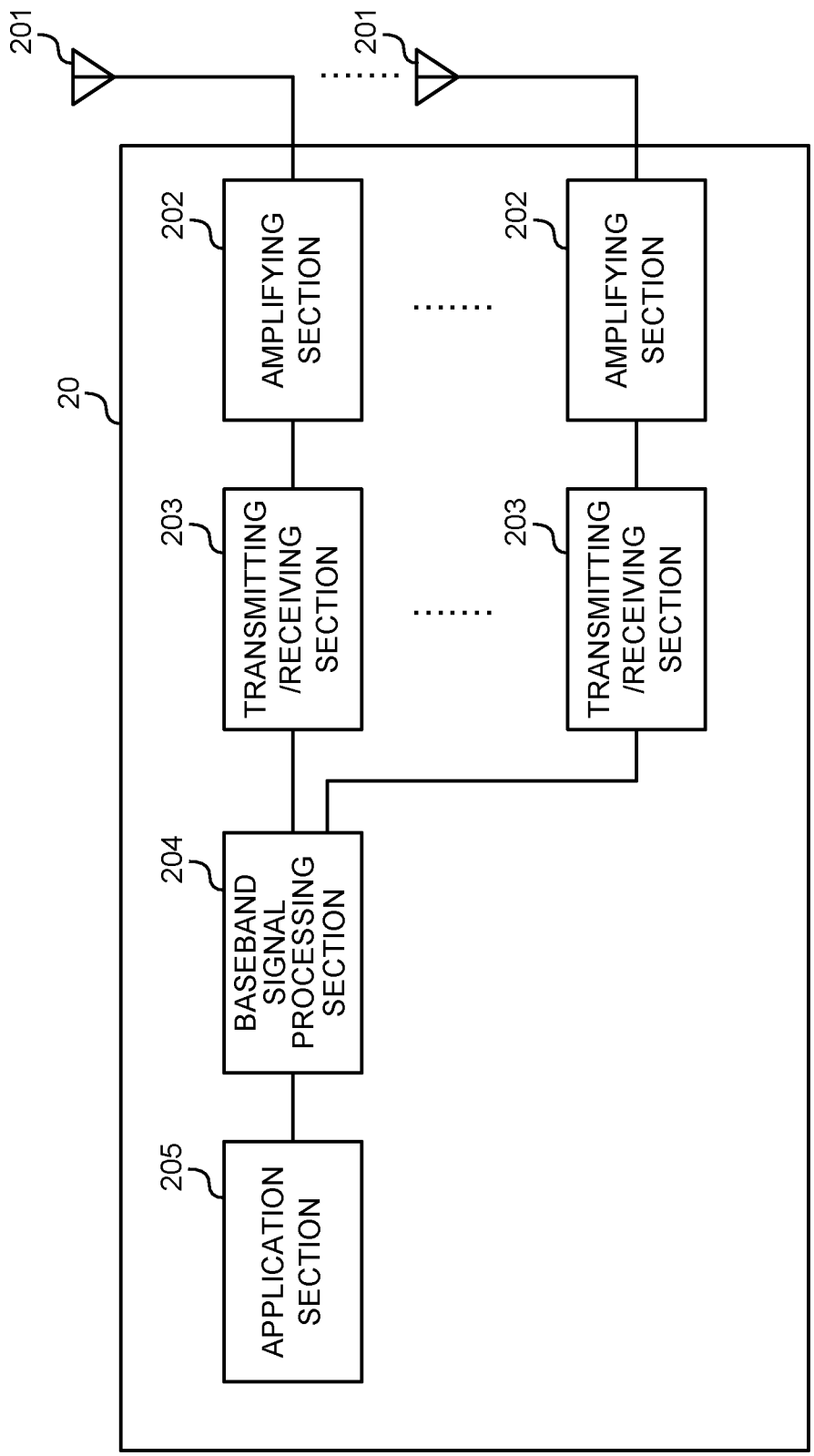
FIG. 19 is a diagram to show an example of an overall structure of a user terminal according to the present embodiment.

FIG. 19 is a diagram to show an example of an overall structure of a user terminal according to the present embodiment. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204.

A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

In the baseband signal processing section 204, the baseband signal that is input is subjected to an FFT process, error correction decoding, a retransmission control receiving process, and so on. Downlink user data is forwarded to the application section 205. The application section 205 performs processes related to higher layers above the physical layer and the MAC layer, and so on. Furthermore, in the downlink data, broadcast information is also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203 baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

Note that the transmitting/receiving sections 203 transmit UL signals and/or DL signals using a plurality of transmission time intervals (TTIs) having different numbers of symbols. For example, the transmitting/receiving sections 203 receive an MCS index ($I_{MCS}$) and the number of PRBs to allocate to a data channel (for example, a UL data channel and/or a DL data channel) in downlink control information. To be more specific, the transmitting/receiving sections 203 receive the number of PRBs to allocate to a UL data channel and the MCS index to apply to the UL data channel in a UL grant, and receive the number of PRBs to allocate to a DL data channel and the MCS index to apply to the DL data channel in a DL assignment.

Figure 20:
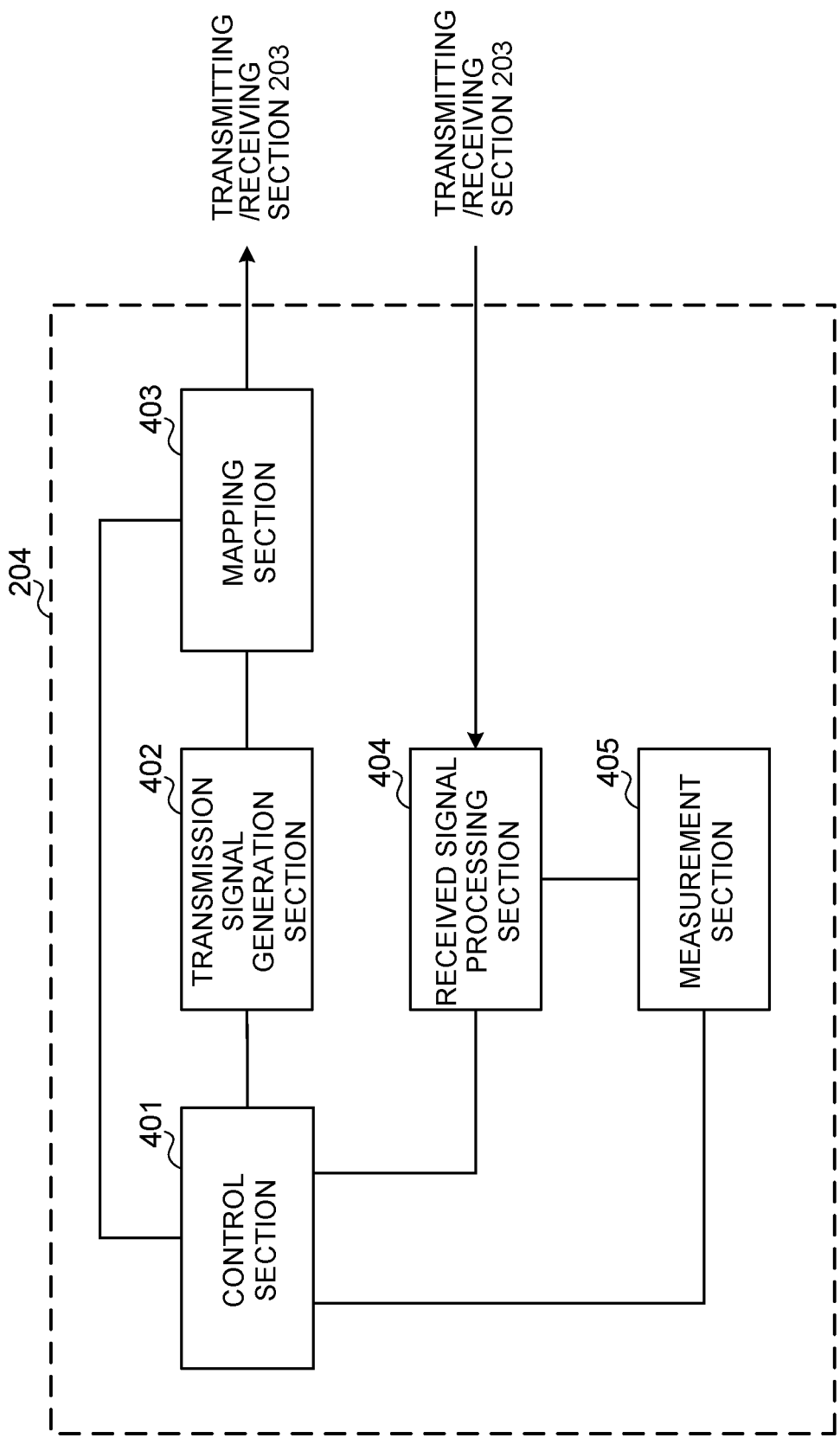
FIG. 20 is a diagram to show an example of a functional structure of a user terminal according to the present embodiment.

FIG. 20 is a diagram to show an example of a functional structure of a user terminal according to the present embodiment. Note that, although FIG. 20 primarily shows functional blocks that pertain to characteristic parts of present embodiment, the user terminal 20 has other functional blocks that are necessary for radio communication as well. As shown in FIG. 20, the baseband signal processing section 204 provided in the user terminal 20 at least has a control section 401, a transmission signal generation section 402, a mapping section 403, a received signal processing section 404 and a measurement section 405.

The control section 401 controls the whole of the user terminal 20. For the control section 401, a controller, a control circuit or control apparatus that can be described based on general understanding of the technical field to which the present invention pertains can be used.

The control section 401, for example, controls the generation of signals in the transmission signal generation section 402, the allocation of signals by the mapping section 403, and so on. Furthermore, the control section 401 controls the signal receiving processes in the received signal processing section 404, the measurements of signals in the measurement section 405, and so on.

The control section 401 acquires the downlink signals (PDCCH/EPDCCH, PDSCH, downlink reference signals, synchronization signals, etc.) transmitted from the radio base station 10 from the received signal processing section 404. The control section 401 controls the generation of uplink signals (for example, PUCCH, PUSCH, etc.) based on the DCI that is included in the PDCCH/EPDCCH (downlink control signal) and the decoding result of the PDSCH (downlink data signal).

In addition, the control section 401 controls the receipt of DL signals and/or the transmission of UL signals by using a predetermined TBS in each TTI. For example, to ensure that the coding rate of a signal varies less when the signal is transmitted and/or received in TTIs with different numbers of symbols, the control section 401 controls the correction of each TTI's TBS that is selected in a TBS table, or controls the selection of TBSs based on target coding rates.

For example, if there is a signal in a TTI where the number of symbols is equal to or less than a predetermined value, the control section 401 corrects the TBS (the first correction method described above). To be more specific, if there is a TTI where the number of symbols is equal to or less than a predetermined value, the control section 401 reduces at least one of $I_{MCS}$, $I_{TBS}$ and $N_{PRB}$ when the TBS is selected from a TBS table, by a predetermined value, and selects a TBS that corresponds to the reduced value (see FIG. 12).

Alternatively, the control section 401 corrects the TBS of each TTI, which is selected individually from a TBS table, based on the reference number of symbols, and then selects the TBS that is closest to the corrected TBS in the TBS table (see the above-described second correction method and FIG. 13).

Alternatively, the control section 401 decides on a predetermined coding rate (target coding rate) based on information reported from the radio base station, and, if there is a TTI where the coding rate is different from the target coding rate, corrects the TBS (make selections from the TBS table) to be closer to the target coding rate (see the third correction method described above, and FIG. 14).

Alternatively, based on a table which at least lists TBSs, and based on a target modulation scheme and a target coding rate that are configured in association with a CQI index and/or an MCS index, the control section 401 selects the TBS that is closest to the target coding rate in the table (see the above-described second aspect and FIG. 15).

The transmission signal generation section 402 generates uplink signals (PUSCH, PUCCH, uplink reference signals and so on) based on commands from the control section 401, and outputs these signals to the mapping section 403. The transmission signal generation section 402 can be constituted by a signal generator, a signal generating circuit or signal generating apparatus that can be described based on general understanding of the technical field to which the present invention pertains. For example, when DCI (UL grant) addressed to the user terminal 20 is included in a downlink control signal from the radio base station 10, the transmission signal generation section 402 is commanded by the control section 401 to generate a PUSCH.

The mapping section 403 maps the uplink signals generated in the transmission signal generation section 402 to radio resources based on commands from the control section 401, and output the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals are, for example, downlink signals transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 outputs the decoded information, acquired through the receiving processes, to the control section 401. The received signal processing section 404 outputs, for example, broadcast information, system information, RRC signaling, DCI and so on, to the control section 401. Also, the received signal processing section 404 outputs the received signals, the signals after the receiving processes and so on, to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

Also, the measurement section 405 measures RRM and CSI according to commands from the control section 401. For example, the measurement section 405 measures CSI using measurement reference signals (the CRS, the CSI-RS, the CRS included in the DRS or the CSI-RS for CSI measurements arranged in DRS-transmitting subframes). The measurement results are output to the control section 401 and transmitted from the transmitting/receiving sections 103 using the PUSCH or the PUCCH.

<Hardware Structure>

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be implemented with 1 piece of physically-integrated apparatus, or may be implemented by connecting 2 physically-separate pieces of apparatus via radio or wire and by using these multiple pieces of apparatus.

Figure 21:
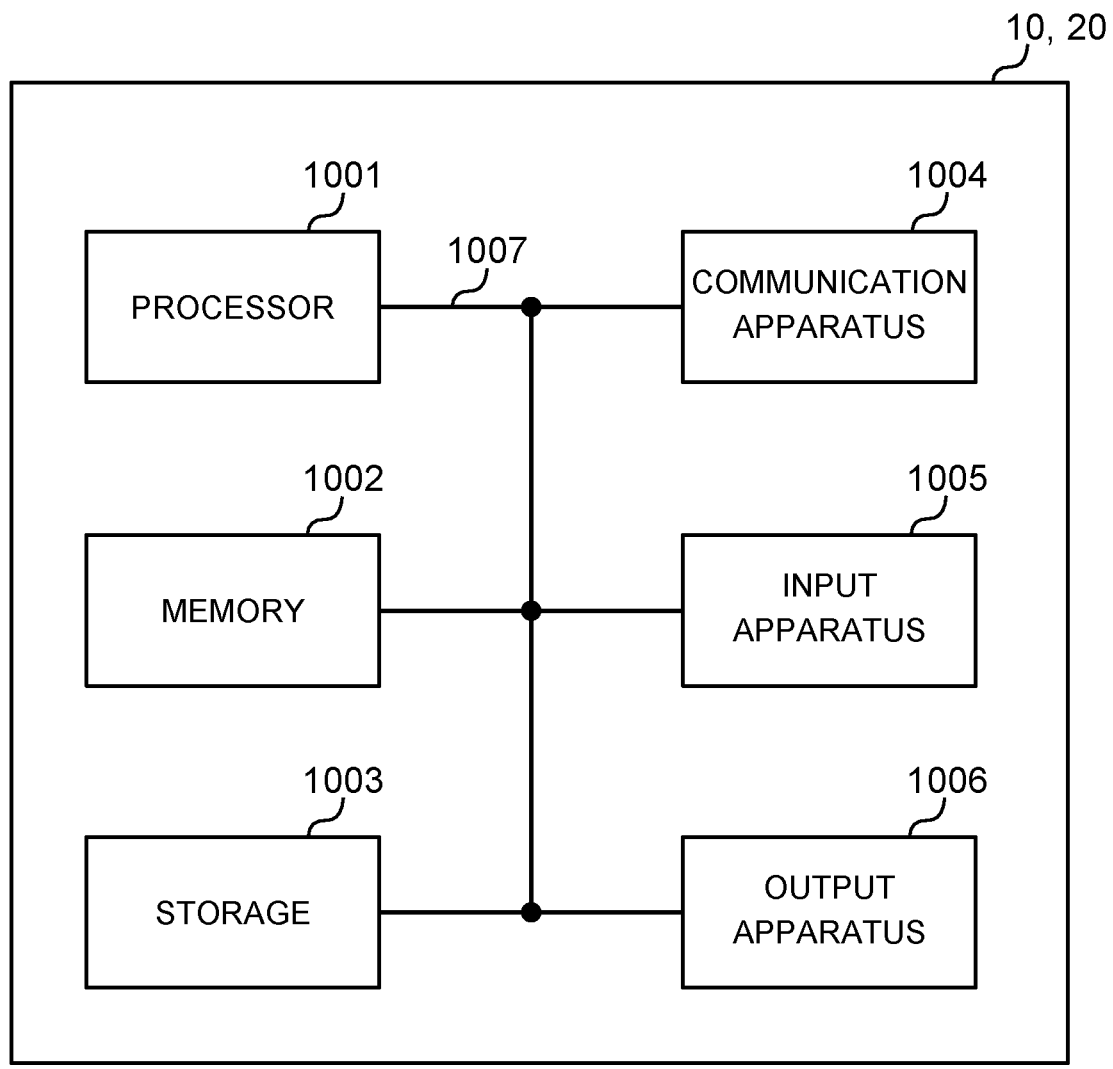
FIG. 21 is a diagram to show an example of a hardware structure of a radio base station and a user terminal according to the present embodiment.

That is, a radio base station, a user terminal and so on according to an embodiment of the present invention may function as a computer that executes the processes of the radio communication method of the present invention. FIG. 21 is a diagram to show an example of a hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented in sequence, or in different manners, on two or more processors.

Each function of the radio base station 10 and the user terminal 20 is implemented by reading predetermined software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001. Note that the processor 1001 may be implemented with one or more chips.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory (primary storage apparatus)" and so on. The memory 1002 can store executable programs (program codes), software modules and the like for implementing the radio communication methods according to one embodiment of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, etc.). The output apparatus 1006 is an output device for sending output to the outside (for example, a display, a speaker, etc.). Note that the input apparatus 1005 and the output apparatus 1006 may be provided in an integrated structure (for example, a touch panel).

Furthermore, these types of apparatus, including the processor 1001, the memory 1002 and others, are connected by a bus 1007 for communicating information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals (or "signaling")." Also, "signals" may be "messages." A reference signal may be abbreviated as an "RS," and may be referred to as a "pilot," a "pilot signal" and so on, depending on which standard applies. Furthermore, a "component carrier" (CC) may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. Furthermore, a slot may be comprised of 1 or multiple symbols (OFDM symbols, SC-FDMA symbols, etc.) in the time domain.

A radio frame, a subframe, a slot and a symbol all represent the time unit in signal communication. A radio frames, a subframe, a slot and a symbol may be each called by other applicable names. For example, one subframe may be referred to as a "transmission time interval (TTI)," or a plurality of consecutive subframes may be referred to as a "TTI," and one slot may be referred to as a "TTI." That is, a subframe and a TTI may be a subframe (1 ms) in existing LTE, may be a shorter period than 1 ms (for example, one to thirteen symbols), or may be a longer period of time than 1 ms.

Here, a TTI refers to the minimum time unit of scheduling in radio communication, for example. For example, in LTE systems, a radio base station schedules the allocation of radio resources (such as the frequency bandwidth and transmission power that can be used by each user terminal) for each user terminal in TTI units. Note that the definition of TTIs is not limited to this. The TTI may be the transmission time unit of channel-encoded data packets (transport blocks), or may be the unit of processing in scheduling, link adaptation and so on.

A TTI having a time duration of 1 ms may be referred to as a "normal TTI (TTI in LTE Rel. 8 to 12)," a "long TTI," a "normal subframe," a "long subframe," etc. A TTI that is shorter than a normal TTI may be referred to as a "shortened TTI," a "short TTI," a "shortened subframe," a "short subframe," or the like.

A resource block (RB) is the unit of resource allocation in the time domain and the frequency domain, and may include one or a plurality of consecutive subcarriers in the frequency domain. Also, an RB may include one or more symbols in the time domain, and may be one slot, one subframe or one TTI in length. One TTI and one subframe each may be comprised of one or more resource blocks. Note that an RB may be referred to as a "physical resource block (PRB: Physical RB)," a "PRB pair," an "RB pair," or the like.

Furthermore, a resource block may be comprised of one or more resource elements (REs). For example, one RE may be a radio resource field of one subcarrier and one symbol.

Note that the above-described structures of radio frames, subframes, slots, symbols and so on are merely examples. For example, configurations such as the number of subframes included in a radio frame, the number of slots included in a subframe, the number of symbols and RBs included in a slot, the number of subcarriers included in an RB, the number of symbols in a TTI, the symbol duration and the cyclic prefix (CP) length can be variously changed.

Also, the information and parameters described in this specification may be represented in absolute values or in relative values with respect to predetermined values, or may be represented in other information formats. For example, radio resources may be specified by predetermined indices. In addition, equations to use these parameters and so on may be used, apart from those explicitly disclosed in this specification.

The names used for parameters and so on in this specification are in no respect limiting. For example, since various channels (PUCCH, PDCCH, etc.) and information elements can be identified by any suitable name, the various names assigned to these various channels and information elements are not limiting in any way.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and output via a plurality of network nodes.

The information, signals and so on that are input may be transmitted to other pieces of apparatus. The information, signals and so on to be input and/or output can be overwritten, updated or appended. The information, signals and so on that are output may be deleted. The information, signals and so on that are input may be transmitted to other pieces of apparatus.

Reporting of information is by no means limited to the aspects/embodiments described in this specification, and other methods may be used as well. For example, reporting of information may be implemented by using physical layer signaling (for example, DCI (Downlink Control Information) and UCI (Uplink Control Information)), higher layer signaling (for example, RRC (Radio Resource Control) signaling, broadcast information (the MIB (Master Information Blocks) and SIBs (System Information Blocks) and so on) and MAC (Medium Access Control) signaling, other signals or combinations of these.

Note that physical layer signaling may be referred to as "L1/L2 (Layer 1/Layer 2) control information" (L1/L2 control signals), "L1control information" (L1 control signal) and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, predetermined information (for example, reporting of information to the effect that "X holds") does not necessarily have to be reported explicitly, and can be reported in an implicit manner (by, for example, not reporting this piece of information).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation and microwaves), these wired technologies and/or wireless technologies are also included in the definition of communication media.

The terms "system" and "network" as used herein are used interchangeably.

As used herein, the terms "base station (BS)," "radio base station," "eNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs: Remote Radio Heads)). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D: Device-to-Device). In this case, user terminals 20 may have the functions of the radio base stations 10 described above. In addition, wording such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base station may, in some cases, be performed by upper nodes. In a network comprised of one or more network nodes with base stations, it is clear that various operations that are performed to communicate with terminals can be performed by base stations, one or more network nodes (for example, MMEs (Mobility Management Entities), S-GWs (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate systems and/or next-generation systems that are enhanced based on these.

The phrase "based on" as used in this specification does not mean "based only on," unless otherwise specified. In other words, the phrase "based on" means both "based only on" and "based at least on."

As used herein the terms "determining" and "determining" encompass a wide variety of operations. For example, to "judge" and "determine" as used herein may be interpreted to mean making judgements and determinations related to calculating, computing, processing, deriving, investigating, looking up (for example, searching a table, a database or some other data structure, ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination thereof. As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency, microwave and optical regions (both visible and invisible).

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2016-078362, filed on Apr. 8, 2016, including the specification, drawings and abstract, is incorporated herein by reference in its entirety.

The invention claimed is:

1. A terminal comprising:
   a receiver that receives downlink control information used for scheduling of a downlink shared channel or an uplink shared channel; and
   a processor that determines a number of symbols allocated to the downlink shared channel or the uplink shared channel within a slot, and determines a transport block size (TBS) of the downlink shared channel or the uplink shared channel based on the number of symbols allocated to the downlink shared channel or the uplink shared channel and on a target code rate that is determined based on a modulation and coding scheme (MCS) index in the downlink control information.

2. The terminal according to claim 1, wherein the processor determines the TBS based on an overhead for the downlink shared channel or the uplink shared channel.

3. The terminal according to claim 1, wherein the processor selects the TBS from a plurality of TBSs.

4. The terminal according to claim 2, wherein the processor selects the TBS from a plurality of TBSs.

5. A base station comprising:
   a transmitter that transmits downlink control information used for scheduling of a downlink shared channel or an uplink shared channel; and
   a processor that determines a number of symbols allocated to the downlink shared channel or the uplink shared channel within a slot, and determines a transport block size (TBS) of the downlink shared channel or the uplink shared channel based on the number of symbols allocated to the downlink shared channel or the uplink shared channel and on a target code rate that is determined based on a modulation and coding scheme (MCS) index in the downlink control information.

6. A radio communication method for a terminal, comprising:
   receiving downlink control information used for scheduling of a downlink shared channel or an uplink shared channel; and
   determining a number of symbols allocated to the downlink shared channel or the uplink shared channel within a slot, and determining a transport block size (TBS) of the downlink shared channel or the uplink shared channel based on the number of symbols allocated to the downlink shared channel or the uplink shared channel and on a target code rate that is determined based on a modulation and coding scheme (MCS) index in the downlink control information.

* * * * *